US012136229B1

(12) United States Patent
Liu et al.

(10) Patent No.: US 12,136,229 B1
(45) Date of Patent: Nov. 5, 2024

(54) GEOMETRIC CONFIDENCE FOR TRACKING OBJECTS

(71) Applicant: Zoox, Inc., Foster City, CA (US)

(72) Inventors: Shuangting Liu, Foster City, CA (US); Francesco Papi, Oakland, CA (US); Qian Song, San Mateo, CA (US)

(73) Assignee: Zoox, Inc., Foster City, CA (US)

( * ) Notice: Subject to any disclaimer, the term of this patent is extended or adjusted under 35 U.S.C. 154(b) by 338 days.

(21) Appl. No.: 17/829,163

(22) Filed: May 31, 2022

(51) Int. Cl.
| | |
|---|---|
| *G06T 7/60* | (2017.01) |
| *B60W 40/04* | (2006.01) |
| *B60W 50/02* | (2012.01) |
| *B60W 60/00* | (2020.01) |
| *G06T 7/20* | (2017.01) |
| *G06V 10/764* | (2022.01) |
| *G06V 10/98* | (2022.01) |
| *G06V 20/56* | (2022.01) |

(52) U.S. Cl.
CPC ............. *G06T 7/60* (2013.01); *B60W 40/04* (2013.01); *B60W 50/0205* (2013.01); *B60W 60/001* (2020.02); *G06T 7/20* (2013.01); *G06V 10/764* (2022.01); *G06V 10/98* (2022.01); *G06V 20/56* (2022.01); *B60W 2554/20* (2020.02); *B60W 2554/4026* (2020.02); *B60W 2554/4029* (2020.02); *B60W 2554/4044* (2020.02); *G06T 2207/20081* (2013.01); *G06T 2207/30252* (2013.01); *G06V 2201/07* (2022.01)

(58) Field of Classification Search
None
See application file for complete search history.

(56) References Cited

U.S. PATENT DOCUMENTS

| | | | |
|---|---|---|---|
| 2021/0056708 A1* | 2/2021 | Li | G06T 7/194 |
| 2021/0150728 A1* | 5/2021 | Ahmed | G06T 7/11 |

\* cited by examiner

*Primary Examiner* — Lennin R Rodriguezgonzalez
(74) *Attorney, Agent, or Firm* — Lee & Hayes, P.C.

(57) ABSTRACT

Techniques for training a model for detecting objects in an environment are discussed herein. For example, techniques can include determining losses associated with spatial features of candidate bounding boxes output by a machine-learned (ML) model and utilizing the losses to train the ML model. Techniques may include determining candidate bounding box(es) associated with an object detected in an environment using the ML model and receiving a ground truth bounding box associated with the detected object. A yaw error loss may be determined by comparing yaw features of the candidate bounding box to the ground truth bounding box. The candidate bounding box may be axis aligned with respect to the ground truth bounding box and an intersection over union (IoU) loss may be determined based on an IoU between the axis aligned candidate bounding box and the ground truth bounding box. The ML model may be trained based on the losses.

20 Claims, 6 Drawing Sheets

GEOMETRIC CONFIDENCE FOR TRACKING OBJECTS

BACKGROUND

Various systems and techniques are utilized by autonomous vehicles to perform detection and tracking of objects, such as vehicles, pedestrians, and bicycles, in an environment. Detection and tracking techniques may use sensors to capture data in the environment. Captured sensor data can be processed for use in detecting objects in the environment and generating bounding boxes representing such objects. These bounding boxes can then be used to navigate an autonomous vehicle in the environment. Generating bounding boxes that accurately represent objects present in an environment based on sensor data may, at times, present challenges.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
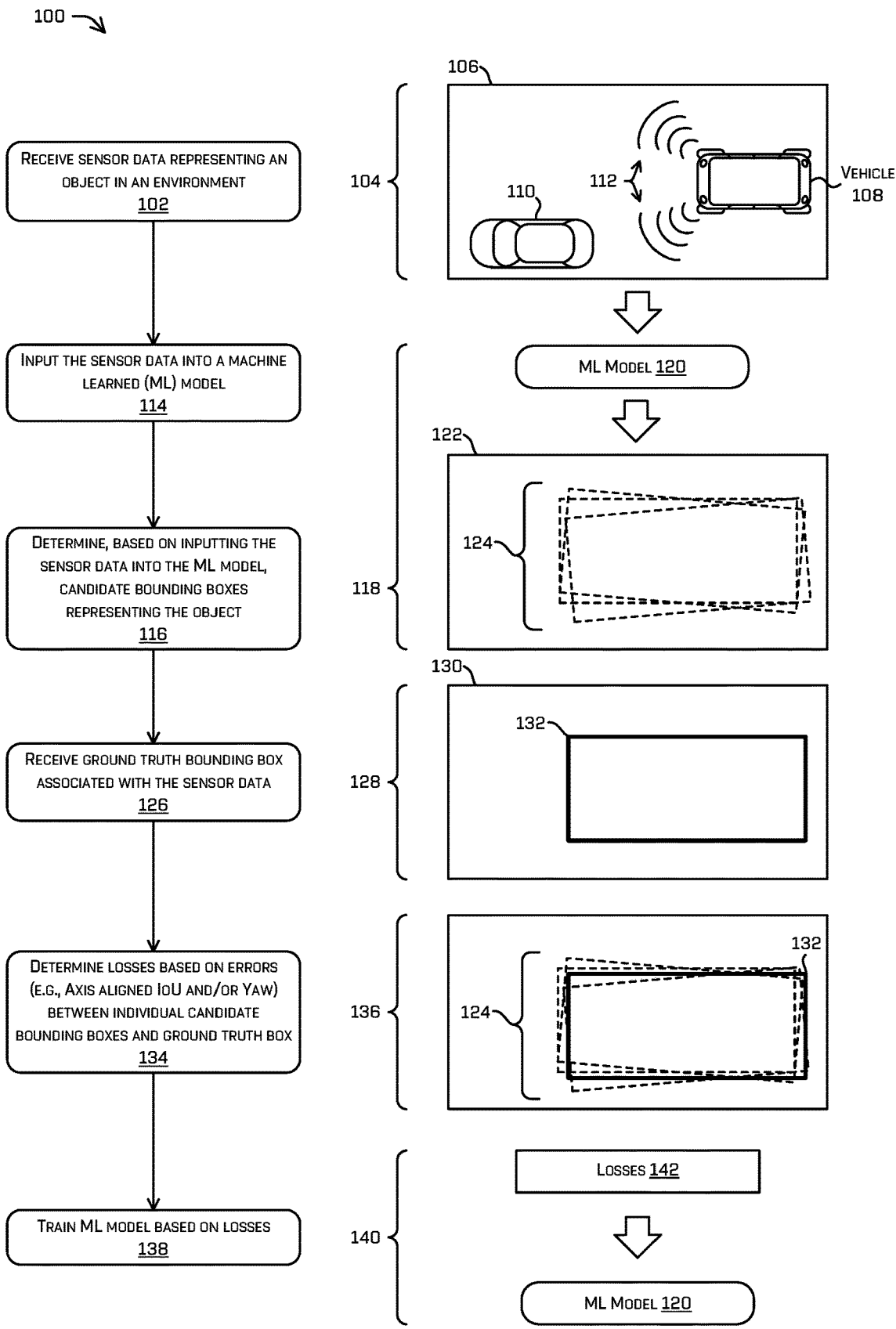
FIG. 1 is a pictorial flow diagram of an example process of determining a candidate bounding box representing an object in an environment using a machine-learned (ML) model, determining a yaw error loss and/or an intersection over union loss between the candidate bounding box and a ground truth bounding box associated with the object, and training the ML model based on the losses.

Techniques for determining losses associated with spatial features of candidate bounding boxes output by a machine-learned (ML) model and utilizing the losses to train the ML model are discussed herein. For example, techniques may include utilizing an ML model to process input data (e.g., sensor data) representing an object in an environment. In some examples, the ML model may output one or more candidate bounding boxes representing the object. Additionally, or alternatively, the ML model may output a loss associated with a confidence value output by the ML model indicating, for a candidate bounding box, how confident the ML model is that the candidate bounding box exists on a pixel associated with the object. Ground truth data associated with the input data may be obtained and utilized to determine various errors between individual ones of the candidate bounding boxes output by the ML model and a ground truth bounding box, included in the ground truth data and associated with the object. Candidate bounding boxes may be manipulated (e.g., rotated and/or transformed) to facilitate calculation of the errors. Additional losses providing indications of how accurate the geometry of such candidate bounding boxes may be determined using the calculated errors. The losses may be leveraged to train the ML model.

Various techniques described herein may include receiving sensor data representing an object in an environment. For example, sensor data may be captured by one or more sensors of an autonomous vehicle traversing the environment. Additional techniques include determining input data, based on the sensor data, and inputting the input data into an ML model, configured to determine a candidate bounding box representing the object in the environment. Based on the input data, ground truth data can be received, including a ground truth bounding box associated with the object. Further, the techniques may include utilizing a feature component to compare various aspects of the candidate bounding box with the ground truth bounding box, such as, for example, the yaw, a geometric alignment (e.g., a comparison of dimensions and/or angles between at least two geometric figures or representations of an object), and/or an intersection over union (IoU). For example, the feature component may determine a yaw error associated with the candidate bounding box based on comparing a first yaw associated with the candidate bounding box to a second yaw associated with the ground truth bounding box. Additionally, or alternatively, the feature component may rotate the candidate bounding box to an axis associated with the ground truth bounding box to determine an axis aligned candidate bounding box. Once the axis aligned candidate bounding box is determined, the feature component may determine an IoU between the ground truth bounding box and the axis aligned candidate bounding box. Finally, a training component may be utilized to determine one or more losses associated with the candidate bounding box output by the ML model.

For example, the training component may determine a first loss based on the yaw error and/or a second loss based on the IoU. In some examples, the losses may be determined in various ways, such as, for example, determining the first loss and/or the second loss according to a classification loss algorithm (e.g., a binary cross entropy loss, a SoftMax loss, and/or the like) and/or a regression loss algorithm (e.g., an L1 regression loss, an L2 regression loss, and/or the like). The training component may leverage such losses to train the ML model, resulting in more robust confidence in training based on the geometric evaluation of spatial features associated with object detections. Because the yaw error loss and the IoU loss techniques described herein may result in more robust confidence for training, the techniques described herein allow for the processing (e.g., using non-maximum suppression) of fewer candidate bounding boxes to determine a detection box for an object, thereby increasing system speed and efficiency. The spatial feature losses and associated object data determined according to the systems and techniques described herein may allow other systems and processes (e.g., prediction, planning, etc.) to obtain greater insight into an environment and thereby generate more accurate data for controlling a vehicle.

The machine-learned model may be configured to output data including one or more candidate bounding boxes associated with an object detected in an environment. In some examples, the data may be configured as multi-channel data, and may include one or more parameters associated with a pixel of an object detection and/or an output candidate bounding box, such as, for example, a confidence value representing a confidence level associated with the candidate bounding box (e.g., how confident the ML model is that the box encompasses a pixel associated with an object detection), center coordinates and/or offset values, a length of the object, a width of the object, a yaw associated with the object, a direction associated with the object, an indication of a motion state associated with the object (e.g., whether the object is stationary or in motion), and/or one or more velocity values.

In some examples, the feature component may determine whether a confidence value parameter associated with a candidate bounding box output by the ML model satisfies a threshold confidence value. In some examples, the feature component may determine that the confidence value does satisfy a threshold confidence value, and as such, the feature component may provide an indication to the system that an object is associated with the candidate bounding box. The feature component and/or the training component may utilize the indication that an object is associated with the candidate bounding box and may proceed to determine losses associated with spatial features of candidate bounding boxes, as described in more detail below. Additionally, or alternatively, the feature component may determine that the confidence value does not satisfy a threshold confidence value, and as such, the feature component may provide an indication to the system that there is not an object associated with the candidate bounding box. The feature component and/or the training component may utilize the indication that there is not an object associated with the candidate bounding box and may cease further processing on such a candidate bounding box.

Since candidate bounding boxes output by the machine-learned model are oriented based on the detected object the candidate bounding boxes may not be axis aligned with respect to a corresponding ground truth box associated with the object. As previously described, determining a geometric alignment and/or an IoU between a candidate bounding box and a corresponding ground truth box may provide an accurate evaluation of the geometry of the detected object with respect to the candidate bounding box. When the confidence value output by the ML model is combined with the determined IoU, the training component may leverage the two data points to train the ML model with a greater level of confidence, specifically with respect to the geometry of the detected object. However, determining an IoU between an unaligned candidate bounding box and a ground truth bounding box may require significant computational power and/or require significant processing time. In some examples, the feature component may be configured to perform a more efficient evaluation of the geometry of the object in a manner that requires less computational power and/or less processing time than determining the IoU between an unaligned candidate bounding box and the ground truth bounding box. For example, the feature component may be configured to determine a yaw error between the candidate bounding box and the ground truth bounding box and/or an IoU between an axis aligned candidate bounding box (e.g., aligning the output candidate bounding box to an axis associated with the ground truth bounding box and/or aligning the ground truth bounding box to an axis associated with the output candidate bounding box) and a corresponding ground truth bounding box. In some examples, the candidate bounding box may be aligned to either and X or a Y axis associated with the ground truth bounding box (or vice versa) based on the closest axis that results in either the length or width of the candidate bounding box to be parallel to either the length or the width associated with the ground truth bounding box. With the axis aligned IoU representing the extent of the candidate detection box and the yaw error representing the orientation of the candidate detection box, the feature component may be configured to quickly compute and configure these two parameters as additional losses to train the ML model on and replace the more computationally expensive IoU between the unaligned candidate bounding box and the ground truth bounding box.

The machine-learned model may be trained by combining one or more parameters (e.g., velocity, center coordinates and/or offset values, length, width, direction, stationariness, etc.) of an output candidate bounding box with additional losses corresponding to spatial features of the object (e.g., the yaw error and/or the IoU) determined using a corresponding ground truth bounding box associated with the object to ensure accurate geometric representation of the object by candidate bounding boxes output by the machine-learned model. For example, a loss may be determined based on a confidence value output by the machine-learned model in association with a candidate bounding box, such as, for example, a classification loss (e.g., a binary cross entropy loss, a SoftMax loss, etc.) indicating whether the confidence value is accurate or inaccurate. Additionally, or alternatively, a loss may be determined based on a geometric alignment, such as, for example, an IoU between a candidate bounding box output by the machine-learned model and the corresponding ground truth bounding box, such as, for example, a regression loss (e.g., an L1 loss, an L2 loss, etc.) representing the geometric accuracy of the candidate bounding box. In some examples, the machine-learned model may then be trained based on the loss representing the confidence value and/or the loss representing the IoU. The losses may be combined with the parameters associated with the candidate bounding box output by the machine-learned model prior to training the model.

Additionally, or alternatively, the loss representing the IoU between the candidate bounding box and the ground truth bounding box may be supplemented by additional geometric alignment losses, which may be computationally less expensive than the loss representing the IoU. For example, a first loss may be determined based on the yaw error associated with the candidate bounding box when compared to the ground truth bounding box and/or a second loss may be determined based on the IoU between the candidate bounding box and the ground truth bounding box by rotating the candidate bounding box to an axis associated with the ground truth bounding box (or alternatively rotating the ground truth bounding box to an axis associated with the candidate bounding box). The first loss and the second loss may be configured to provide substantially similar indications of the geometric losses associated with the output by the model when compared to the loss representing the IoU between the unaligned candidate bounding box and the ground truth bounding box. The losses (e.g., the loss representing the confidence value, the first loss, and/or the second loss) may be combined with the parameters associated with the candidate bounding box output by the machine-learned model prior to training the model.

Additionally, or alternatively, the training component may be configured to weight the one or more losses prior to training the ML model (e.g., apply one or more weighting values and/or one or more weighting algorithms and/or formulas to the losses) based on various observations associated with the confidence value output by the machine learned model, the yaw error determined for a candidate bounding box, and/or the IoU determined for a candidate bounding box. While example scenarios of applying weights to one or more losses are described below, such scenarios are exemplary and not intended to be limiting as any weights to any losses may be tuned to any values depending on use case and/or desired outcomes. In some examples, the training component may determine a weight to apply to a loss based on a classification of the object, one or more dimensions associated with a candidate bounding box, one or more parameters associated with a candidate bounding box satisfying a threshold value (e.g., being less than, greater than, or sufficiently close to a threshold value). Different weights may be applied to different losses, where losses with greater weights than losses with lesser weights have a greater significance when training the ML model.

In some examples, the training component may determine a classification of the object associated with a candidate bounding box. The training component may determine that the classification corresponds to a pedestrian and the training component may apply a first weight to the confidence value and a second weight to the yaw loss and/or the IoU loss, where the first weight is greater than the second weight. Additionally, or alternatively, the training component may determine that the classification corresponds to a vehicle and the training component may apply a first weight to the yaw loss and/or the IoU and a second weight to the confidence value, where the first weight is greater than the second weight. While examples of a classification corresponding to a pedestrian and a vehicle are included, the classification may correspond to any one of a vehicle, a pedestrian, a bicycle, a vehicle having non-standard vehicular dimensions (e.g., a semi-truck, a tractor, a tow truck, and/or the like), and/or a stationary object (e.g., a roadblock, a garbage can, and/or the like), and any number of weights may be applied to the losses (e.g., the loss associated with the confidence value, the IoU loss, the yaw loss, and/or the axis aligned IoU loss) prior to training.

Additionally, or alternatively, the weights may be further applied and/or modified based on additional parameters associated with a candidate bounding box, such as, for example, dimensions (e.g., length, width, and/or height) associated with the object, a velocity associated with the object, a motion state associated with the object, and/or the like.

Additionally, or alternatively, the training component may identify one or more dimensions associated with a candidate bounding box. For example, the training component may identify a length and/or a width associated with the candidate bounding box, and the training component may determine a difference between the length and the width. In some examples, the training component may determine that a difference between the length and the width satisfies a threshold difference, and thus the system should consider the yaw loss and the IoU loss with higher confidence than the confidence value during training. As such, the training component may apply a first weight to the yaw loss and/or the IoU and a second weight to the confidence value, where the first weight is greater than the second weight. Additionally, or alternatively, the training component may determine that a difference between the length and width does not satisfy the threshold difference, or is otherwise sufficiently close in dimension, and thus the system should consider the yaw loss, the IoU loss, and the confidence value with the same confidence during training. As such, the training component may forgo weighting the losses and/or weight the losses based on additional observations.

Additionally, or alternatively, the feature component may be configured to identify a good yaw score associated with a candidate bounding box. For example, the feature component may determine that a yaw parameter associated with a candidate bounding box is within a threshold similarity to a yaw parameter associated with a corresponding ground truth bounding box (e.g., within 1 degree of each other), and the feature component may provide an indication to the system that this is a good yaw score and thus the system should consider the yaw loss with a higher confidence than the IoU loss and the confidence value at the time of training. In such examples, the training component may apply a first weight to the yaw loss and a second weight to the IoU and/or the confidence value, where the first weight is greater than the second weight.

In some examples, the data input to and/or output by the machine-learned model may be configured as a two-dimensional representation of an environment and/or a three-dimensional representation of the environment. In examples where the input data and/or the output data is configured as a two-dimensional representation, a yaw loss and/or an axis aligned IoU loss may be determined for a candidate bounding box and utilized to further train the machine-learned model. Additionally, or alternatively, when the input data and/or the output data is configured as a three-dimensional representation, a yaw loss, a roll loss, a pitch loss, and/or an axis aligned IoU loss may be determined for a candidate bounding box and utilized to further train the machine-learned model. In such three-dimensional representation examples, one or more IoU losses may be determined by aligning the candidate bounding box to one or more axes of the ground truth bounding box (or vice versa). In some examples, the number of IoU losses determined may correspond to the number of axes that are aligned.

The techniques discussed herein may improve the functioning of a computing device, such as a computing device of an autonomous vehicle and/or a computing device remote from and associated with the autonomous vehicle, in a number of ways. For example, systems and techniques described herein may be directed to leveraging sensor data and pixel data to enable a vehicle, such as an autonomous vehicle, to more accurately identify and locate objects in an environment and therefore navigate through the environment more safely by circumventing such objects. The systems and techniques described herein can utilize spatial features associated with a candidate bounding box output by a machine-learned model to more accurately determine the geometry of an object associated with the output bounding box, and therefore facilitate the generation of a more accurate bounding box for the object. The systems and techniques described herein can also increase the efficiency of output detection box determination using geometric criteria through the axial alignment of the candidate bounding box with the ground truth bounding box prior to determining the IoU when used in combination with the yaw-error (e.g., because this takes less computational resources to determine an IoU between boxes that are aligned on the same axis and the yaw-error is preserved), thereby reducing the processing required to determine an output bounding box from among the candidate bounding boxes versus using pure IoU techniques, for example.

The systems and techniques described herein can also increase the accuracy of machine-learned models by training such models using more accurate geometric data associated with object by determining the yaw-error loss and the IoU loss and combining the spatial feature losses with the additional features output the machine-learned model prior to training. This in turn may improve the accuracy of object detection and improve safety outcomes because the geometric losses of a detection box determined as described herein may provide superior confidence with respect to the accuracy of the geometrical representation of the detected object when compared to traditional confidence values output with candidate boxes representing confidence that the box is encompassing the object. Therefore, the examples described herein may result in increased certainty of object detections, specifically with respect to the geometry of such detections, thereby allowing an autonomous vehicle to generate more accurate and/or safer trajectories for the autonomous vehicle to traverse in the environment. For example, techniques described herein may be more robust than conventional techniques, as they may increase the reliability of the determination of dimensions and other physical parameters of objects in the environment, reducing the likelihood of failing to identify or misidentifying an object. For example, by training the ML model on a yaw-based loss associated with a candidate bounding box, the accuracy of yaw determinations made by the ML model can be increased. By increasing the accuracy of the yaw determinations output by the ML model, an autonomous vehicle operating based on such detections can avoid unnecessary safety events (e.g., performing a hard stop based on an inaccurate yaw detection) and the overall quality of the autonomous vehicle experience can be improved. That is, techniques described herein provide a technological improvement over existing object detection, localization, tracking, and/or navigation technology, allowing an autonomous vehicle utilizing the technology disclosed herein to traverse areas with tighter tolerances. In addition to improving the accuracy, the systems and techniques described herein can provide a smoother ride and improve safety outcomes by, for example, more accurately providing safe passage to an intended destination. Thus, the techniques described herein may improve a functioning of a computing device as well as improve safety outcomes.

The techniques described herein may be implemented in a number of ways. Example implementations are provided below with reference to the following figures. Although discussed in the context of an autonomous vehicle, the methods, apparatuses, and systems described herein may be applied to a variety of systems (e.g., a sensor system or a robotic platform), and are not limited to autonomous vehicles. In one example, similar techniques may be utilized in driver-controlled vehicles in which such a system may provide an indication of whether it is safe to perform various maneuvers. In another example, the techniques may be utilized in a manufacturing assembly line context, in an aerial surveying context, or in a nautical context. Additionally, the techniques described herein may be used with real data (e.g., captured using sensor(s)), simulated data (e.g., generated by a simulator), or any combination of the two.

Figure 6:
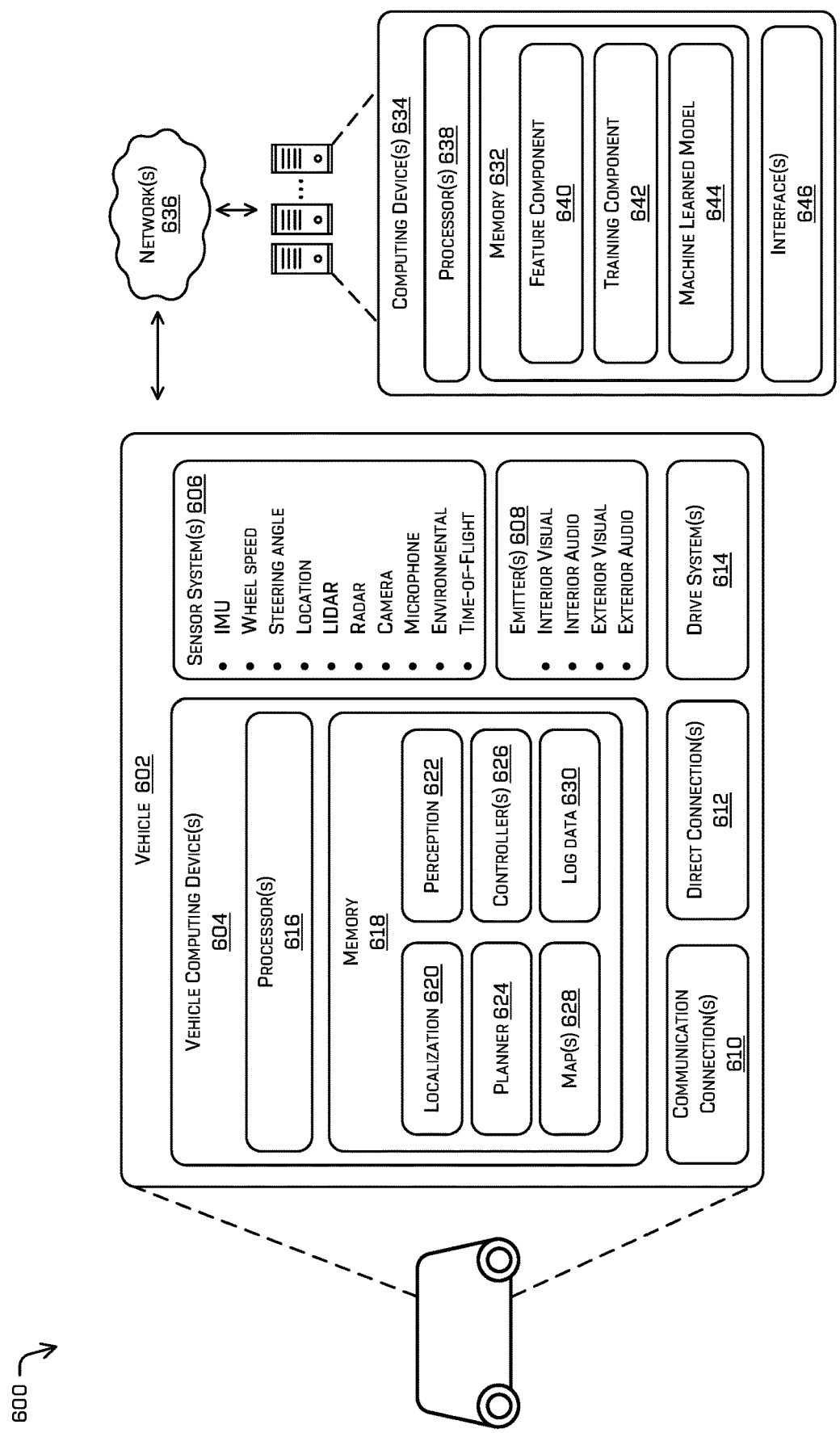
FIG. 6 is a block diagram of an example system for implementing the techniques described herein.

FIG. 1 is a pictorial flow diagram of an example process 100 of determining a candidate bounding box representing an object in an environment using a machine-learned (ML) model, determining a yaw error loss and an intersection over union loss between the candidate bounding box and a ground truth bounding box associated with the object, and training the ML model based on the losses. In examples, one or more operations of the process 100 may be implemented by a vehicle computing system 604, such as by using one or more of the components and systems illustrated in FIG. 6 and described below. For example, one or more components and systems can include those associated with a machine-learned model 644 illustrated in FIG. 6, such as, for example, a deep tracking network including the machine-learned model 644. In examples, the one or more operations of the process 100 may be performed by a remote system in communication with a vehicle, such as the computing device (s) 634 illustrated in FIG. 6. In still other examples, the one or more operations of the process 100 may be performed by a combination of a remote system and a vehicle computing system. However, the process 100 is not limited to being performed by such components and systems, and the components and systems of FIG. 6 are not limited to performing the process 100.

The one or more operations of the process 100, as well as any other operations, systems, and techniques described herein, may be directed to detecting any type and number of objects, including one or more vehicles, pedestrians, and bicycles. For example, the process 100 and/or any other processes described herein may be implemented one or more object detection networks (e.g., that may be configured in a deep tracking network). Individual networks of such object detection networks may be implemented for particular objects (e.g., in parallel). For example, a tracking network may implement, in parallel (or otherwise), a vehicle detection network, a pedestrian detection network, and/or a bicycle detection network. In another example, a tracking network may implement, in parallel (or otherwise), one or more coarse-grained vehicle detection networks, one or more fine-grained vehicle detection networks, one or more coarse-grained pedestrians and/or bicycle detection networks, and one or more fine-grained pedestrians and/or bicycle detection networks. Any other suitable detection network and/or detection system configurations may incorporate one or more of the systems and techniques described herein.

At operation 102, the process 100 may include receiving sensor data representing an object in an environment. In some examples, one or more sensors configured at an autonomous vehicle may detect data in the environment using the one or more sensors and generate sensor data based on such detections. In various examples, the sensors may include one or more lidar sensors, camera sensors, radar sensors, sonar sensors, audio sensors, ultrasonic transducers, and/or any other suitable sensors. This data may be collected (or received), stored, and/or processed by a vehicle computing device to perform one or more operations, such as those described herein. In examples, the sensor data collected at operation 102 may be provided to a deep tracking network (DTN) and/or a machine-learned model for processing as described in more detail below. In some examples, sensor data can be received by or from a stationary sensor not associated with a vehicle, such as a sensor associated with infrastructure.

An example 104 illustrates a top-down view of an environment 106 that includes a vehicle 108 that may be configured with sensors to detect objects in the environment 106, such as an object 110. A vehicle computing device of the vehicle 108 may be configured to receive sensor data 112 from the sensors of the vehicle 108 and use the sensor data as described herein, for example, to generate one or more candidate bounding boxes (also referred to herein as candidate detection boxes) for the object 110.

At operation 114, the process 100 may include inputting the sensor data into a machine-learned (ML) model. Additionally, or alternatively, the process 100 may include determining input data, such as, multi-channel input data, for example to input into the ML model based on the sensor data. For example, the system may generate input data configured as a two-dimensional representation of an environment and/or a three-dimensional representation of the environment (also referred to herein as a two-dimensional tensor and/or a three-dimensional tensor).

At operation 116, the process 100 may include determining one or more candidate bounding boxes representing the object 110. In some examples, the ML model may be configured to determine the one or more candidate bounding boxes based on the sensor data 112 input into the ML model and/or the input data input into the ML model. In some examples, the process 100 may include generating output data by the ML model, where the output data may be configured as multi-channel output data including at least a candidate bounding box representing the object 110. In some examples, the multi-channel output data may be configured as a two-dimensional representation of an environment and/or a three-dimensional representation of the environment (also referred to herein as a two-dimensional tensor and/or a three-dimensional tensor).

In some examples, the multi-channel input data and/or the multi-channel output data may encode or otherwise store one or more features (also referred to herein as parameters) as a layer of the multi-channel input data. Thus, the data may be efficiently represented for input to the ML model.

For example, the ML model may accept input data and/or generate output data in various forms, such as, for example, the form of multi-channel input data and/or multi-channel output data. Particularly, the model accepts input data in the form of a tensor of size equal to the number of X and Y discretizations of the grid, the tensor having a number of layers equal to the number of discretizations in the Z dimension, where the Z dimension is indicative of a height dimension.

Additionally, or alternatively, the Z dimension may be configured with pixels having a fixed height. In some examples, features for each of these channels, equal to the number of layers of pixels in the Z dimension having the fixed height, may be computed, and all of the features in these channels may be represented as a multi-channel input data for input to the ML model and/or multi-channel output data generated by the ML model.

In some examples, the multi-channel input data and/or multi-channel output data may include one or more layer(s) of input data. For example, the multi-channel input and/or multi-channel output data can include a first two-dimensional layer (e.g., first channel) associated with first feature data and a second two-dimensional layer (e.g., second channel) associated with second feature data. Additionally, or alternatively, the multi-dimensional input data and/or multi-channel output data can include a group of two-dimensional layers, such as the first channel and the second channel associated with feature data representing a single feature. For example, the layer(s) of input data and/or output data can include one or more layers of data associated with a pixel of an object detection and/or an output candidate bounding box, such as, for example, a confidence value representing a confidence level associated with the candidate bounding box (e.g., how confident the ML model is that the box encompasses a pixel associated with an object detection), center coordinates and/or offset values, a length of the object, a width of the object, a yaw associated with the object, a direction associated with the object, an indication of a motion state associated with the object (e.g., whether the object is stationary or in motion), and/or one or more velocity values.

An example 118 illustrates an ML model 120 that takes sensor data 112 as input and generates output data 122. In some examples, the ML model1 120 may be configured to take the multi-channel input data as input and generate the output data 122. In some examples, the output data 122 may include one or more candidate bounding boxes 124 associated with the detection of the object 110. Additionally, or alternatively, the output data 122 may include various layers, as described above, corresponding to various features output by the ML model 120 and associated with a candidate bounding box 124.

At operation 126, the process 100 may include receiving ground truth data associated with the input data. In some examples, the ground truth data may correspond to detections represented by the input data, such as, for example, the detection of the object 110 in the environment represented by the sensor data 112. Additionally, or alternatively, the ground truth data may include a ground truth bounding box associated with the object 110 (e.g., a ground truth bounding box representing the object 110 in the environment 106).

An example 128 illustrates ground truth data 130 including a ground truth bounding box 132 associated with the object 110 in the environment 106. In some examples, the ground truth data 130 may include various layers, as described above, corresponding to various features associated with the object 110 in the environment 106.

At operation 134, the process 100 may include determining losses based on errors between individual ones of the candidate bounding boxes (e.g., a candidate bounding box) and the ground truth box. In some examples, the operation 134 may include determine an IoU loss associated with the candidate bounding box 124, the operation 134 may include determining a yaw error loss associated with the candidate bounding box 124 based on comparing a yaw parameter associated with the candidate bounding box 124 to a yaw parameter associated with the ground truth bounding box 132. Additionally, or alternatively, the operation 134 may include determining an axis aligned candidate bounding box by aligning the candidate bounding box 124 with an axis associated with the ground truth bounding box 132. Additionally, or alternatively, the operation 134 may include determining an intersection over union (IoU) between the axis aligned candidate bounding box 124 and the ground truth bounding box 132.

The feature component may determine an IoU between the candidate bounding box 124 and the ground truth bounding box 132.

The feature component may determine a yaw error associated with a candidate bounding box 124 based on comparing a first yaw associated with the candidate bounding box 124 to a second yaw associated with the ground truth bounding box 132. The feature component may then identify a difference between the first yaw and the second yaw (e.g., represented by degrees of rotation). For example, the feature component may determine the yaw error by comparing the first yaw to the second yaw. Additionally, or alternatively, the feature component may utilize the axis associated with the ground truth bounding box 132 (e.g., where a line of the axis may be configured using the second yaw) and determine the yaw error based on comparing the first yaw to the axis.

The feature component may also determine an axis aligned candidate bounding box based on the candidate bounding box 124 and the ground truth bounding box 132. For example, the feature component may be configured to rotate the candidate bounding box 124 such that the candidate bounding box 124 is axially aligned with the ground truth bounding box 132 (or vice versa). Once the feature component determines the axis aligned candidate bounding box, the feature component may determine an IoU between the axis aligned candidate bounding box and the ground truth bounding box 132.

Determining the yaw error and/or the IoU between a candidate bounding box 124 and a ground truth bounding box 132 is described in more detail below with respect to FIGS. 2-4B.

An example 136 illustrates an example comparison of the candidate bounding boxes 124 and the ground truth bounding box 132. In some examples, the feature component may perform techniques described above for determining the yaw error and/or the IoU for individual ones of the candidate bounding boxes 124.

The training component may determine an IoU loss between the candidate bounding box 124 and the ground truth bounding box using one or more regression loss techniques, such as, for example, an L1 regression loss and/or an L2 regression loss.

Additionally, or alternatively, the training component may determine a first loss representing the yaw error associated with the candidate bounding box 124. For example, the training component may determine, based on the yaw error, if the yaw associated with the candidate bounding box 124 is a good yaw or not. As previously described, the training component may determine that a yaw error associated with a candidate bounding box 124 is a good yaw if the yaw error is less than a threshold error (e.g., within 1 degree, 2 degrees, etc.). The training component may then configure the first loss as a classification loss, such as, for example, a binary cross entropy loss and/or a SoftMax loss, indicating whether the yaw associated with the candidate bounding box 124 is a good yaw or not. Techniques for determining the first loss and/or the yaw error associated with a candidate bounding box 124 is described in more detail below with respect to FIGS. 3B, 4A, and 4B.

Additionally, or alternatively, the training component may determine a second loss representing the IoU between the axis aligned candidate bounding box and the ground truth bounding box 132. For example, the training component determine the second loss based on the IoU between the candidate bounding box 124 and the ground truth bounding box 132 using one or more regression algorithms, such as, for example, a direct regression to the axis aligned IoU number associated with the candidate bounding box 124. Techniques for determining the second loss and/or the IoU associated with an axis aligned candidate bounding box 124 is described in more detail below with respect to FIG. 3A.

Additionally, or alternatively, the training component may determine a loss associated with a confidence value output by the ML model 120 in association with the candidate bounding box 124. For example, the training component may determine, based on the confidence value, whether or not a detection of an object exists in association with the candidate bounding box 124. The training component may then configure the loss associated with the confidence value as a classification loss, such as, for example, a binary cross entropy loss and/or a SoftMax loss, indicating that either a detection of the object exists or a detection of the object does not exist with respect to the candidate bounding box 124.

At operation 138, the process 100 may include training the ML model 120 based on one or more losses associated with the candidate bounding box 124. In some examples, a training component associated with the vehicle computing system and/or the remote computing system, such as, for example, training component 642 described with respect to FIG. 6, may be configured to determine one or more losses associated with one or more parameters of the candidate bounding box 124, as described with respect to operation 134. The ML model 120 may consume the losses and/or additional parameters associated with a candidate bounding box 124 to increase the accuracy of the output from the ML model 120 during subsequent inferencing operations.

An example 140 illustrates the losses 142, determined by the training component, being input into the ML model 120. In some examples, prior to training the ML model 120, the training component may apply one or more weights to the losses 142 based on various observations associated with the confidence value output by the machine learned model 120, the yaw error determined for a candidate bounding box 124, and/or the IoU determined for a candidate bounding box 124. While example scenarios of applying weights to one or more losses are described below, such scenarios are exemplary and not intended to be limiting as any weights to any losses may be tuned to any values depending on use case and/or desired outcomes. In some examples, the training component may determine a weight to apply to a loss based on a classification of the object, one or more dimensions associated with a candidate bounding box 124, one or more parameters associated with a candidate bounding box 124 satisfying a threshold value (e.g., being less than, greater than, or sufficiently close to a threshold value). Different weights may be applied to different losses, where losses with greater weights than losses with lesser weights have a greater significance when training the ML model 120.

For example, the training component may determine a classification of the object associated with a candidate bounding box 124. The training component may determine that the classification corresponds to a pedestrian and the training component may apply a first weight to the confidence value and a second weight to the yaw loss and/or the IoU loss, where the first weight is greater than the second weight. Additionally, or alternatively, the training component may determine that the classification corresponds to a vehicle and the training component may apply a first weight to the yaw loss and/or the IoU and a second weight to the confidence value, where the first weight is greater than the second weight.

Additionally, or alternatively, the training component may identify one or more dimensions associated with a candidate bounding box 124. For example, the training component may identify a length and/or a width associated with the candidate bounding box 124, and the training component may determine a difference between the length and the width. Length and width are used as examples and area, circumference, or other geometric features indicating size and/or the confidence value output by the ML model may be used in the disclosed techniques. In some examples, the training component may determine that a difference between the length and the width satisfies a threshold difference, and thus the system should consider the yaw loss and the IoU loss with higher confidence than the confidence value during training. As such, the training component may apply a first weight to the yaw loss and/or the IoU and a second weight to the confidence value, where the first weight is greater than the second weight. Additionally, or alternatively, the training component may determine that a difference between the length and width does not satisfy the threshold difference, or is otherwise sufficiently close in dimension, and thus the system should consider the yaw loss, the IoU loss, and the confidence value with the same confidence during training. As such, the training component may forgo weighting the losses and/or weight the losses based on additional observations.

Additionally, or alternatively, the feature component may be configured to identify a good yaw score associated with a candidate bounding box 124. For example, the feature component may determine that a yaw parameter associated with a candidate bounding box 124 is within a threshold similarity to a yaw parameter associated with a corresponding ground truth bounding box 132 (e.g., within 1 degree of each other), and the feature component may provide an indication to the system that this is a good yaw score and thus the system should consider the yaw loss with a higher confidence than the IoU loss and the confidence value at the time of training. In such examples, the training component may apply a first weight to the yaw loss and a second weight to the IoU and/or the confidence value, where the first weight is greater than the second weight.

In some examples, data such as confidence values, errors, IoUs, and/or losses determined as discussed herein may be used by downstream processes or may be received by other components along with object data. For example, a prediction system may receive object data and the data to make predictions about the data. In some examples, a planning system can receive object data and associated data and can plan a trajectory based on the object data and/or the data. In some examples, the object data and data can be used to populate an occupancy grid in which an occupied status of individual regions of the occupancy grid can be weighted or otherwise determined based on the data, as discussed herein. Additional examples and contemplated and the scope is not limited to the express examples discussed herein.

Figure 2:
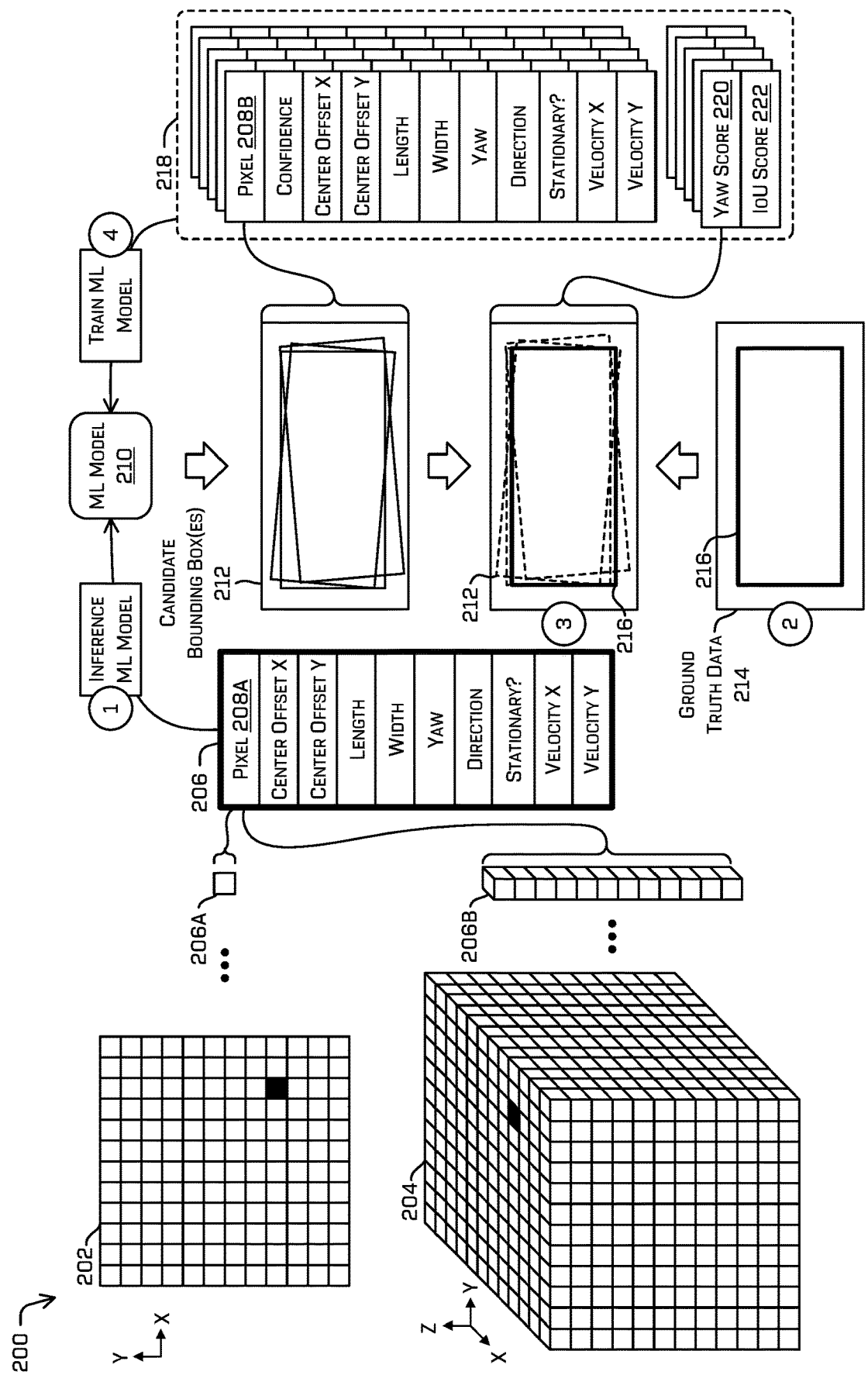
FIG. 2 depicts representations of an example flow diagram for determining losses, associated with candidate bounding boxes output by a machine-learned model, and used to train the ML model.

FIG. 2 depicts representations of an example system 200 and flow diagram for determining losses, associated with candidate bounding boxes output by a machine-learned (ML) model, and used to train the ML model. In some examples, the ML model may be configured as the ML model 120 described with respect to FIG. 1.

In some examples, the system 200 may include one or more representations of an environment determined using sensor data captured by one or more sensors associated with a vehicle traversing the environment, such as, for example, a two-dimensional tensor 202 representing the environment and/or a three-dimensional tensor 204 representing the environment. In some examples the two-dimensional tensor 202 and/or the three-dimensional tensor 204 may be configured as multi-channel input data encoded with or otherwise storing one or more features (also referred to herein as parameters) as a layer of the multi-channel input data. Thus, the data may be efficiently represented for input to the ML model 210.

For example, the ML model 210 may accept input data in various forms, such as, for example, the form of multi-channel input data. Particularly, the model accepts input data in the form of a tensor of size equal to the number of X and Y discretizations of the grid, the tensor having a number of layers equal to the number of discretizations in the Z dimension, where the Z dimension is indicative of a height dimension.

Additionally, or alternatively, the Z dimension may be configured with pixels having a fixed height. In some examples, features for each of these channels, equal to the number of layers of pixels in the Z dimension having the fixed height, may be computed, and all of the features in these channels may be represented as a multi-channel input data for input to the ML model 210.

In some examples, the multi-channel input data may include one or more layer(s) of input data. For example, the multi-channel input data can include a first two-dimensional layer (e.g., first channel) associated with first feature data and a second two-dimensional layer (e.g., second channel) associated with second feature data. Additionally, or alternatively, the multi-dimensional input data can include a group of two-dimensional layers, such as the first channel and the second channel associated with feature data representing a single feature.

As illustrated in FIG. 2, a black square of the two-dimensional tensor 202 may correspond to a detection of an object in the environment represented by the isolated cell 206A and/or a black square of the three-dimensional tensor 204, identified by viewing the three-dimensional tensor 204 from a top-down view, may correspond to a detection of an object in the environment represented by the isolated column of three-dimensional cells 206B. In some examples, the isolated cell 206A and/or the isolated column of three-dimensional cells 206B may be configured as input data for processing by the ML model 210 and corresponding to a pixel 208A associated with the detection of the object in the environment. The pixel 208A may include various parameters associated with the object detection, such as, for example, center coordinates and/or offset values associated with the detected object, a length of the detected object, a width of the detected object, a yaw associated with the detected object, a direction associated with the detected object, an indication of a motion state associated with the object (e.g., whether the detected object is stationary or in motion), and/or one or more velocity values associated with the detected object.

At "1," the system 200 may input the two-dimensional tensor 202 and/or the three-dimensional tensor 204, including the pixel 208A corresponding to the object detection into the ML model 210. The ML model 210 may be configured as a trained ML model 210 included in a deep tracking network (DTN). In some examples, the ML model 210 may output one or more candidate bounding boxes 212 associated with the pixel 208A corresponding to the detected object. In some examples, the ML model 210 may output individual ones of the candidate bounding boxes 212 in association with a pixel 208B including additional features associated with the object detection. For example, the pixel 208B may include a confidence value representing a confidence level associated with the candidate bounding box 212 (e.g., how confident the ML model 210 is that the candidate bounding box 212 encompasses the pixel 208A associated with an object detection.

At "2," the system 200 may receive ground truth data 214 associated with the object. The ground truth data 214 may include a ground truth bounding box 216 providing an accurate representation of the object in the real environment (e.g., including at least an accurate yaw, pitch, roll, and/or IoU associated with the object).

At "3," the system 200 may perform determine one or more losses associated with the candidate bounding box 212 and/or the pixel 208B including additional features associated with the object detection. In some examples, the system 200 may determine the one or more losses associated with the candidate bounding box 212 based on various data and/or determinations made with respect to the candidate bounding box 212 and/or the ground truth bounding box 216, such as, for example, a yaw error associated with the candidate bounding box 212, and IoU associated with the candidate bounding box 212, and/or a confidence value associated with the candidate bounding box 212 and output by the ML model 210.

In some examples, the system 200 may determine a yaw error loss associated with the candidate bounding box 212 based on comparing a yaw parameter associated with the candidate bounding box 212 to a yaw parameter associated with the ground truth bounding box 216. Additionally, or alternatively, the system 200 may determine an axis aligned candidate bounding box by aligning the candidate bounding box 212 with an axis associated with the ground truth bounding box 216. Additionally. or alternatively, the system 200 may determine an intersection over union (IoU) between the axis aligned candidate bounding box and the ground truth bounding box 216.

The system may include a feature component configured to determine a yaw error associated with a candidate bounding box 212 based on comparing a first yaw associated with the candidate bounding box 212 to a second yaw associated with the ground truth bounding box 216. The feature component may then identify a difference between the first yaw and the second yaw (e.g., represented by degrees of rotation). For example, the feature component may determine the yaw error by comparing the first yaw to the second yaw: Additionally, or alternatively, the feature component may utilize the axis associated with the ground truth bounding box 216 (e.g., where a line of the axis may be configured using the second yaw) and determine the yaw error based on comparing the first yaw to the axis.

The feature component may also determine an axis aligned candidate bounding box based on the candidate bounding box 212 and the ground truth bounding box 216. For example, the feature component may be configured to rotate the candidate bounding box 212 such that the candidate bounding box 212 is axially aligned with the ground truth bounding box 216. Once the feature component determines the axis aligned candidate bounding box, the feature component may determine an IoU between the axis aligned candidate bounding box and the ground truth bounding box 216.

Determining the yaw error and/or the IoU between a candidate bounding box 212 and a ground truth bounding box 216 is described in more detail below with respect to FIGS. 3A-4B.

The system 200 may also include a training component configured to determine the confidence value loss associated with the candidate bounding box 212. For example, the training component may determine, based on the confidence value, whether or not a detection of an object exists in association with the candidate bounding box 212. The training component may then configure the loss associated with the confidence value as a classification loss, such as, for example, a binary cross entropy loss and/or a SoftMax loss, indicating that either a detection of the object exists or a detection of the object does not exist with respect to the candidate bounding box 212.

Additionally, or alternatively, the training component may determine a yaw loss 220 representing the yaw error associated with the candidate bounding box 212. For example, the training component may determine, based on the yaw error, if the yaw associated with the candidate bounding box 212 is a good yaw or not. As previously described, the training component may determine that a yaw error associated with a candidate bounding box 212 is a good yaw if the yaw error is less than a threshold error (e.g., within 1 degree, 2 degrees, etc.). The training component may then configure the yaw loss 220 as a classification loss, such as, for example, a binary cross entropy loss and/or a SoftMax loss, indicating whether the yaw associated with the candidate bounding box 212 is a good yaw or not. Techniques for determining the yaw loss 220 and/or the yaw error associated with a candidate bounding box 212 are described in more detail below with respect to FIGS. 3B, 4A, and 4B.

Additionally, or alternatively, the training component may be configured to determine an IoU loss 222 representing the IoU between the axis aligned candidate bounding box and the ground truth bounding box 216. For example, the training component determine the IoU loss 222 based on the IoU between the candidate bounding box 212 and the ground truth bounding box 216 using one or more regression algorithms, such as, for example, a direct regression to the axis aligned IoU number associated with the candidate bounding box 212. Techniques for determining the IoU loss 222 and/or the IoU associated with an axis aligned candidate bounding box 212 are described in more detail below with respect to FIG. 3A.

Once the losses have been determined, the training component may then determine training data 218. The training data 218 may include various features associated with the candidate bounding box 212, such as, for example, a confidence value representing a confidence level associated with the candidate bounding box 212 (e.g., how confident the ML model 210 is that the box encompasses the pixel 208A associated with an object detection), center coordinates and/or offset values associated with the candidate bounding box 212, a length of the candidate bounding box 212, a width of the candidate bounding box 212, a yaw associated with the candidate bounding box 212, a direction associated with the candidate bounding box 212, an indication of a motion state associated with the object (e.g., whether the object is stationary or in motion), and/or one or more velocity values. Additionally, or alternatively, the training data 218 may include the yaw loss 220 and/or the IoU loss 222 associated with the candidate bounding box 212.

At "4," the system 200 may train the ML model 210 based on the training data 218. As previously described, the ML model 210 may be a component (or a layer) of a deep tracking network (DTN). The steps "1-4," of the flow described herein may be repeated any number of times to further train the ML model 210, thus yielding more accurate inference results with more repetition.

Figures 3A, 3B:
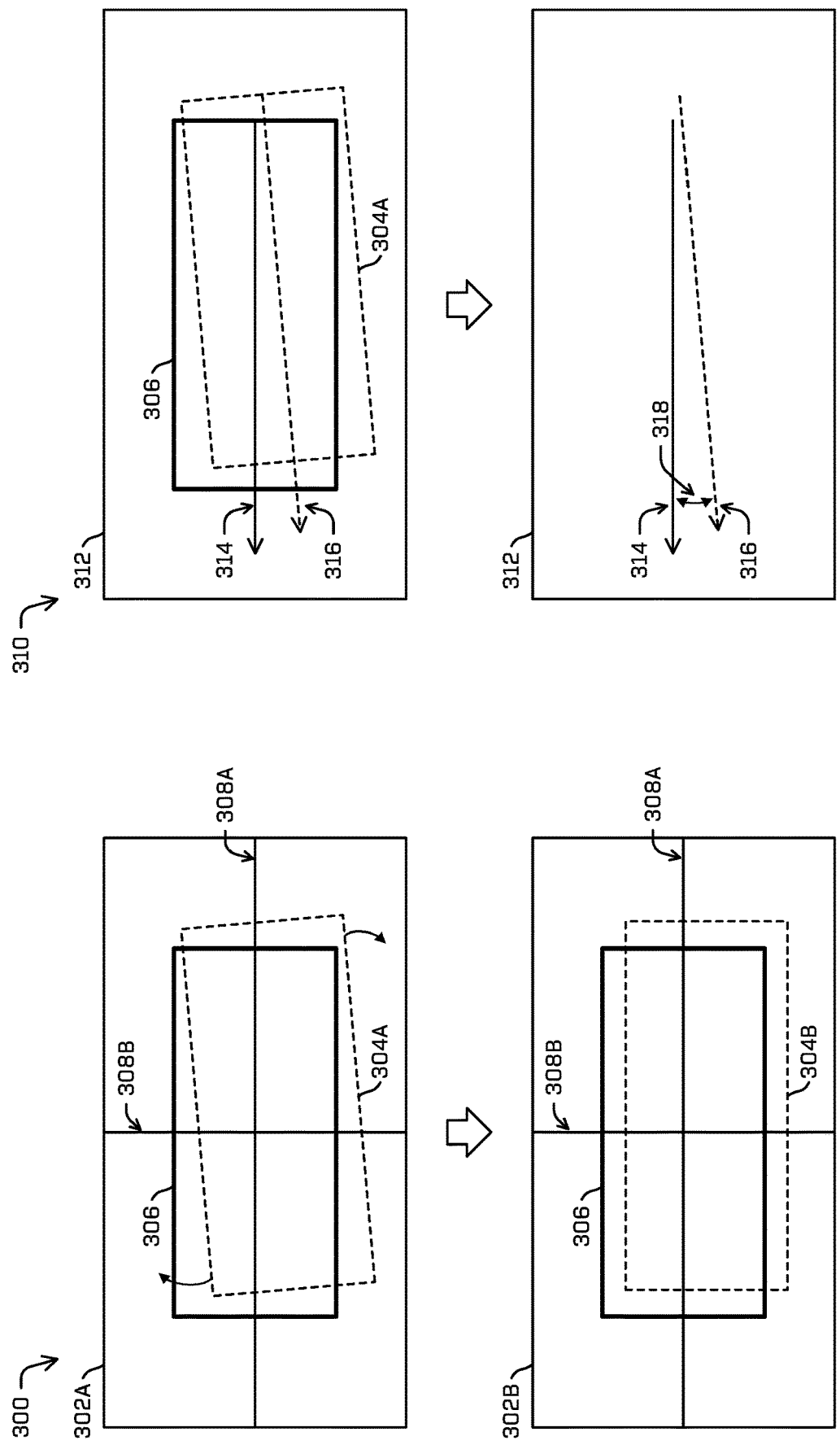
FIG. 3A depicts an example diagram for determining an intersection over union between a candidate bounding box representing an object detected in an environment and a ground truth bounding box associated with the object.
FIG. 3B depicts an example diagram for determining a yaw error between a candidate bounding box representing an object detected in an environment and a ground truth bounding box associated with the object.

FIG. 3A depicts an example diagram 300 for determining an intersection over union (IoU) between a candidate bounding box 304A representing an object detected in an environment and a ground truth bounding box 306 associated with the object.

As previously described with respect to FIGS. 1 and 2, a feature component may be configured to determine an IoU between a candidate bounding box 304A and a ground truth bounding box 306. Prior to determining the IoU associated with the candidate bounding box 304A, the feature component may be configured to determine an axis aligned candidate bounding box 304B. In some examples, an axis aligned candidate bounding box 304B may be determined by rotating the candidate bounding box 304A to be aligned with at least one of a first axis 308A associated with the ground truth bounding box 306 and/or a second axis 308B associated with the ground truth bounding box 306. Example 302A depicts the candidate bounding box 304A prior to the axial alignment and example 302B depicts the axis aligned candidate bounding box 304B. As illustrated, the ground truth bounding box 306 is aligned square to the first axis 308A and/or the second axis 308B, and the candidate bounding box 304A is rotated from example 302A to be aligned with the first axis 308A and/or the second axis 308B as shown in example 302B. Once aligned to the axis 308 associated with the ground truth bounding box 306, the feature component may determine an IoU between the axis aligned candidate bounding box 304B and the ground truth bounding box 306. The IoU may be determined based on the overlap between the axis aligned candidate bounding box 304B and the ground truth bounding box 306.

FIG. 3B depicts an example diagram 310 for determining a yaw error between a candidate bounding box 304A representing an object detected in an environment and a ground truth bounding box associated with the object. Example 312 depicts the ground truth bounding box 306 and a first yaw 314 associated with the ground truth bounding box 306, and the candidate bounding box 304A and a second yaw 316 associated with of the candidate bounding box 304A.

As previously described with respect to FIGS. 1 and 2, a feature component may be configured to identify a first yaw 314 associated with the ground truth bounding box 306 and a second yaw 316 associated with the candidate bounding box 304A. In some examples, the feature component may identify a difference between the first yaw 314 and the second yaw 316 to identify an angle representing a yaw error 318 between the first yaw 314 and the second yaw 316. For example, the feature component may determine the yaw error 318 by comparing a value of the first yaw 314 to a value of the second yaw 316. Additionally, or alternatively, the feature component may utilize the axis associated with the ground truth bounding box 306, such as, for example, the axis 308 as illustrated in FIG. 3A, which may be configured using the first yaw 314 associated with the ground truth bounding box 306 and determine the yaw error 318 based on comparing the second yaw associated with the candidate bounding box 304A to the axis.

Figure 4A:
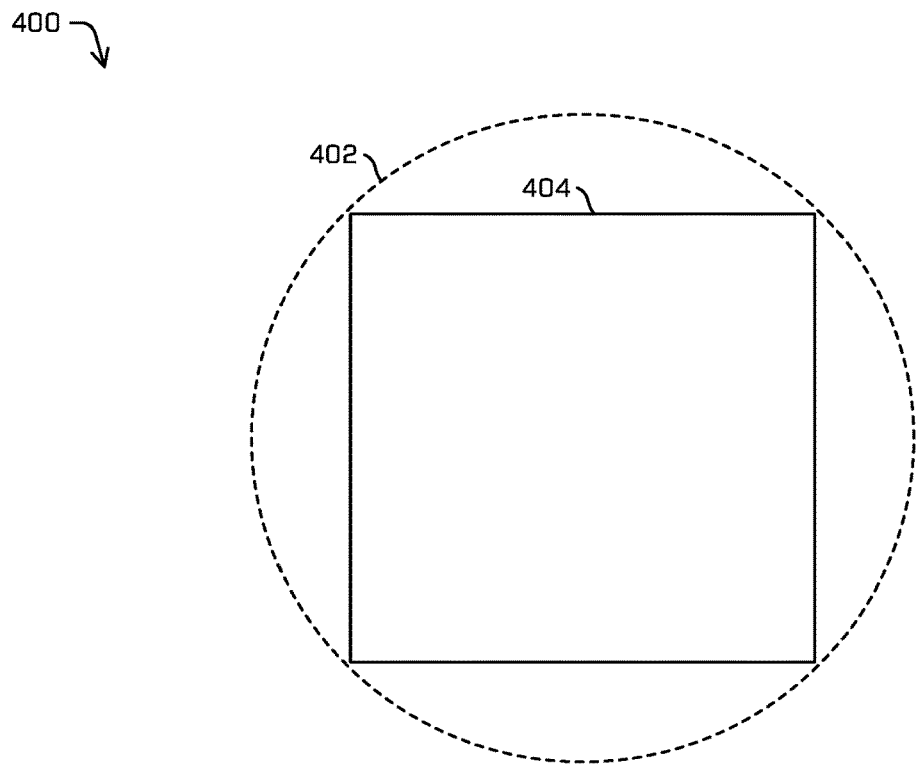
FIG. 4A depicts an example diagram representing the potential yaw error of an object having a substantially similar length and width.
Figure 4B:
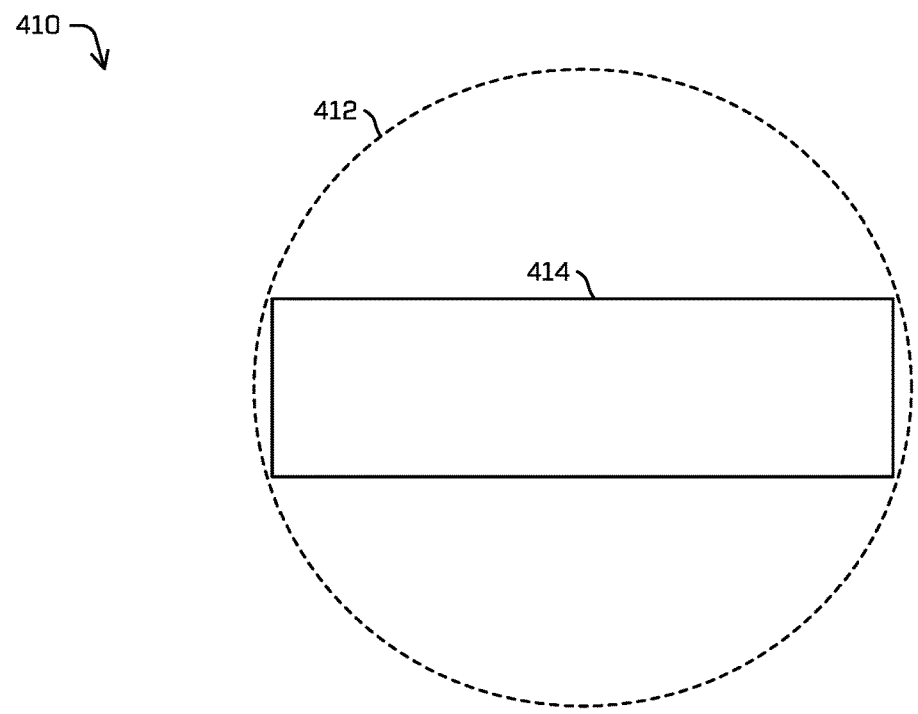
FIG. 4B depicts an example diagram representing the potential yaw error of an object having a substantially different length and width.

FIGS. 4A and 4B collectively illustrate the difference between potential yaw errors 402, 412 of candidate bounding boxes 404, 414 associated with objects having substantially different dimensions.

FIG. 4A depicts an example diagram 400 representing the potential yaw error 402 of a candidate bounding box 404 associated with an object having a substantially similar length and width. As illustrated, the potential yaw error 402 associated with candidate box 404 represents all (e.g., 360 degrees of rotation) potential yaw error 402 scenarios of the candidate bounding box 404. For example, the potential yaw error 402 is determined by rotating the candidate bounding box 404 360 degrees.

FIG. 4B depicts an example diagram 410 representing the potential yaw error 412 of a candidate bounding box 414 associated with an object having a substantially different length and width. As illustrated, the potential yaw error 412 associated with candidate box 414 represents all (e.g., 360 degrees of rotation) potential yaw error 412 scenarios of the candidate bounding box 414. For example, the potential yaw error 412 is determined by rotating the candidate bounding box 414 360 degrees.

As can be seen from FIGS. 4A and 4B, the candidate bounding box 404 having substantially similar length and width dimensions has a significantly lesser potential yaw error 402 than the potential yaw error 412 associated with the candidate bounding box 414 having substantially different length and width dimensions. Take, for example, the candidate bounding box 404 being associated with a first object detection of a vehicle parked along the side of a roadway. If the candidate bounding box 404 has a yaw error pointing the front end or rear end of the vehicle into the roadway, the potential yaw error 402 may be minimal enough to not effect passage by a vehicle on the roadway operating based on the technologies described herein. Alternatively, take, for example, the candidate bounding box 414 associated with a second object detection of a vehicle parked along the side of the roadway. If the candidate bounding box 414 has a yaw error pointing the front end or the rear end of the vehicle into the roadway, the potential yaw error 412 may be substantial enough that the passage of a vehicle on the roadway, operating based on the technologies described herein, may be interrupted (e.g., caused to perform a safe stop operation) based on the yaw error associated with the candidate bounding box 414, even when the actual object is not protruding into the roadway.

As such, in some scenarios where a candidate bounding box 414 has a substantially different length and width, the training component may weight the yaw loss greater than the other losses prior to training. Additionally, or alternatively, in some scenarios where a candidate bounding box 404 has a substantially similar length and width, the training component may weight the yaw loss lesser than the other losses prior to training.

Figure 5:
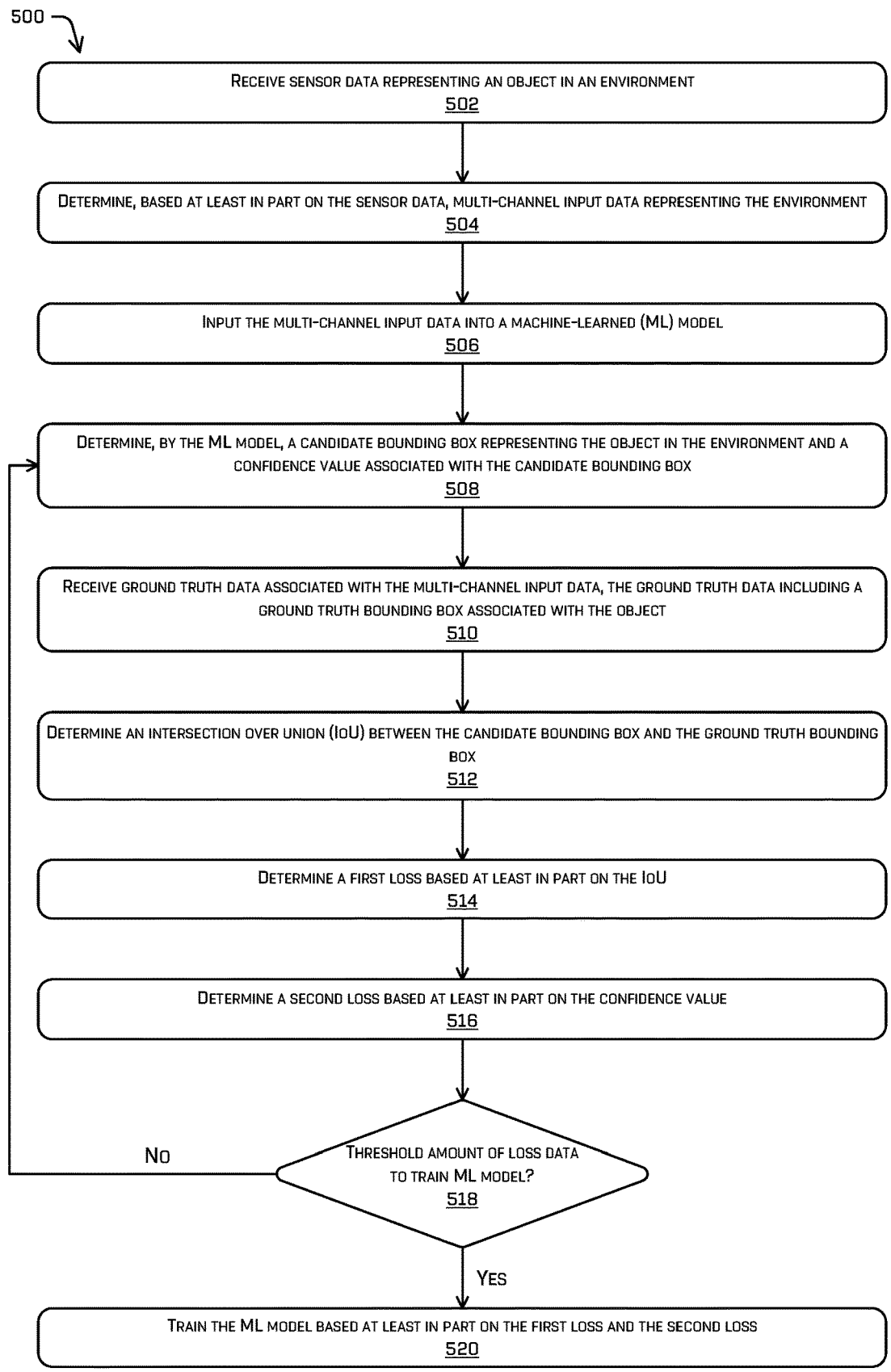
FIG. 5 is an example process for determining a candidate bounding box representing an object in an environment using a machine-learned (ML) model, determining a yaw error loss and an intersection over union loss between the candidate bounding box and a ground truth bounding box associated with the object, and training the ML model based on the losses.

FIGS. 1 and 5 illustrate example processes in accordance with examples of the disclosure. These processes are illustrated as a logical flow graph, each operation of which represents a sequence of operations that may be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations may be omitted or combined in any order and/or in parallel to implement the processes. For example, some or all of the processes 100 and/or 500 may be performed by one or more components in FIG. 6, as described herein. For example, some or all of the processes 100 and/or 500 may be performed by the feature component 640, the training component 642, and/or the machine learned model 644.

FIG. 5 is an example process 500 for determining a candidate bounding box representing an object in an environment using a machine-learned (ML) model, determining a yaw error loss and an intersection over union loss between the candidate bounding box and a ground truth bounding box associated with the object, and training the ML model based on the losses. In some examples, the candidate bounding box, the object, the environment, the ML model, and/or the ground truth bounding box may correspond to the candidate bounding box 124, the object 110, the environment 106, the ML model 120, and/or the ground truth bounding box 132, as described with respect to FIG. 1, respectively.

The process 500 begins at operation 502 and includes receiving sensor data representing an object in an environment. Additional details of receiving sensor data are discussed throughout this disclosure.

At operation 504, the process 500 may include determining multi-channel input data representing the environment. In some examples, the multi-channel input data may be based at least in part on the sensor data. Additionally, or alternatively, the sensor data may be configured as multi-channel input data. In some examples, the multi-channel input data may be configured as a two-dimensional tensor and/or a three-dimensional tensor representing the environment, such as, for example, the two-dimensional tensor 202 and the three-dimensional tensor 204 as described with respect to FIG. 2.

At operation 506, the process 500 may include inputting the multi-channel input data into a machine-learned (ML) model. Additionally, or alternatively, operation 506 may include inputting the sensor data into the ML model.

At operation 508, the process 500 may include determining a candidate bounding box representing the object in the environment. In some examples, the ML model may determine the candidate bounding box representing the object in the environment, based on the input data. Additionally, or alternatively, operation 508 may include determining a confidence value associated with the candidate bounding box. In some examples, the ML model may output the confidence value in association with the candidate bounding box, based on the input data. Additionally, or alternatively, the ML model may output additional data in association with the candidate bounding box, such as, for example, the output data 218 as described with respect to FIG. 2.

At operation 510, the process 500 may include receiving ground truth data associated with the multi-channel input data. In some examples, the ground truth data may include a ground truth bounding box associated with the object.

At operation 512, the process 500 may include determining an intersection over union (IoU) between the ground truth bounding box and the candidate bounding box. In some examples, the feature component may be configured to determine the IoU between the ground truth bounding box and the candidate bounding box.

Additionally, or alternatively, the process 500 may include determining a yaw error associated with the candidate bounding box. In some examples, a feature component may be configured to determine the yaw error. Additionally, or alternatively, the yaw error may be determined based at least in part on a first yaw of the candidate bounding box and/or a second yaw of the ground truth bounding box. Additionally, or alternatively, the yaw error may be determined using any of the techniques described with respect to FIG. 3B.

Additionally, or alternatively, the process 500 may include determining an axis aligned candidate bounding box. In some examples, determining the axis aligned bounding box may be based at least in part on the ground truth bounding box. Additionally, or alternatively, the feature component may be configured to determine the axis aligned bounding box. Additionally, or alternatively, the axis aligned bounding box may be determined using any of the techniques described with respect to FIG. 3A. Additionally, or alternatively, the process 500 may include determining an axis aligned IoU between the axis aligned candidate bounding box and the ground truth bounding box.

At operation 514, the process 500 may include determining a first loss based on the IoU. In some examples, the first loss may be configured as a regression loss, such as, for example, and L1 regression loss and/or an L2 regression loss.

Additionally, or alternatively, operation 514 may include determining a first supplemental loss based on the yaw error and/or a second supplemental loss based on the axis aligned IoU. In some examples, a training component may be configured to determine the first loss, the first supplemental loss, and/or the second supplemental loss. Additionally, or alternatively, the first loss, the first supplemental loss, and/or the second supplemental loss may be determined using any of the techniques described with respect to FIGS. 1 and 2. In some examples, the first supplemental loss may be configured as a classification loss, such as, for example, a binary cross entropy loss and/or a SoftMax loss and/or the second supplemental loss may be configured as a regression loss, such as, for example, a L1 regression loss and/or an L2 regression loss.

At operation 516, the process 500 may include determining a second loss based at least in part on the confidence value. In some examples, the second loss may be configured as a classification loss, such as, for example, a binary cross entropy loss and/or a SoftMax loss.

At operation 518, the process 500 may include determining whether a threshold amount of loss data has been collected to train the ML model. In some examples, a confidence value may be output by the ML model in association with the candidate bounding box, and it may be determined whether the confidence value satisfies a threshold confidence value. By way of example, the operations 518 may include determining that the amount of loss data collected satisfies a threshold amount to sufficiently train the ML model and/or that the confidence value satisfies the threshold confidence value. By way of another example, the operation 518 may include determining that the amount of loss data collected does not satisfy a threshold amount to sufficiently train the ML model and/or that the confidence value does not satisfy the threshold confidence value. The process 500 may subsequently include the operation 508 to restart a portion of the process 500, based on determining that an insufficient amount of loss data has been collected.

At operation 520, the process 500 may include training the ML model based at least in part on the first loss and the second loss.

FIG. 6 is a block diagram of an example system 600 for implementing the techniques described herein. In at least one example, the system 600 may include a vehicle 602, such as vehicle 108.

The vehicle 602 may include a vehicle computing device 604, one or more sensor systems 606, one or more emitters 608, one or more communication connections 610, at least one direct connection 612, and one or more drive systems 614.

The vehicle computing device 604 may include one or more processors 616 and memory 618 communicatively coupled with the one or more processors 616. In the illustrated example, the vehicle 602 is an autonomous vehicle: however, the vehicle 602 could be any other type of vehicle, such as a semi-autonomous vehicle, or any other system having at least an image capture device (e.g., a camera enabled smartphone). In the illustrated example, the memory 618 of the vehicle computing device 604 stores a localization component 620, such as localization component 620, a perception component 622, a planner component 624, one or more system controllers 626, one or more maps 628, and log data 630. Though depicted in FIG. 6 as residing in the memory 618 for illustrative purposes, it is contemplated that the localization component 620, the perception component 622, the planner component 624, the system controller(s) 626, and the map(s) 628 may additionally, or alternatively, be accessible to the vehicle 602 (e.g., stored on, or otherwise accessible by, memory remote from the vehicle 602, such as, for example, on memory 632 of a computing device 634). As described herein, the localization component 620, the perception component 622, the planner component 624, and the system controller(s) 626 may collectively comprise a vehicle controller.

In at least one example, the localization component 620 may include functionality to receive data from the sensor system(s) 606 to determine a position and/or orientation of the vehicle 602 (e.g., one or more of an x-, y-, z-position, roll, pitch, or yaw). For example, the localization component 620 may include and/or request/receive a map of an environment and may continuously determine a location and/or orientation of the autonomous vehicle within the map. In some instances, the localization component 620 may utilize SLAM (simultaneous localization and mapping), CLAMS (calibration, localization and mapping, simultaneously), relative SLAM, bundle adjustment, non-linear least squares optimization, or the like to receive image data, LIDAR data, radar data, IMU data, GPS data, wheel encoder data, and the like to accurately determine a location of the autonomous vehicle. In some instances, the localization component 620 may provide data to various components of the vehicle 602 to determine an initial position of an autonomous vehicle for generating a path polygon associated with the vehicle path, as discussed herein.

In some instances, the perception component 622 may include functionality to perform object detection, segmentation, and/or classification. In some examples, the perception component 622 may provide processed sensor data that indicates a presence of an object (e.g., entity) that is proximate to the vehicle 602 and/or a classification of the object as an object type (e.g., car, pedestrian, cyclist, animal, building, tree, road surface, curb, sidewalk, unknown, etc.). In some examples, the perception component 622 may provide processed sensor data that indicates a presence of a stationary entity that is proximate to the vehicle 602 and/or a classification of the stationary entity as a type (e.g., building, tree, road surface, curb, sidewalk, unknown, etc.).

In additional or alternative examples, the perception component 622 may provide processed sensor data that indicates one or more characteristics associated with a detected object (e.g., a tracked object) and/or the environment in which the object is positioned. In some examples, characteristics associated with an object may include, but are not limited to, an x-position (global and/or local position), a y-position (global and/or local position), a z-position (global and/or local position), an orientation (e.g., a roll, pitch, yaw), an object type (e.g., a classification), a velocity of the object, an acceleration of the object, an extent of the object (size), etc. Characteristics associated with the environment may include, but are not limited to, a presence of another object in the environment, a state of another object in the environment, a time of day, a day of a week, a season, a weather condition, an indication of darkness/light, etc.

In general, the planner component 624 may determine a path for the vehicle 602 to follow to traverse through an environment. For example, the planner component 624 may determine various routes and trajectories and various levels of detail. For example, the planner component 624 may determine a route to travel from a first location (e.g., a current location) to a second location (e.g., a target location). For the purpose of this discussion, a route may include a sequence of waypoints for travelling between two locations. As non-limiting examples, waypoints include streets, intersections, global positioning system (GPS) coordinates, etc. Further, the planner component 624 may generate an instruction for guiding the vehicle 602 along at least a portion of the route from the first location to the second location. In at least one example, the planner component 624 may determine how to guide the vehicle 602 from a first waypoint in the sequence of waypoints to a second waypoint in the sequence of waypoints. In some examples, the instruction may be a trajectory, or a portion of a trajectory. In some examples, multiple trajectories may be substantially simultaneously generated (e.g., within technical tolerances) in accordance with a receding horizon technique, wherein one of the multiple trajectories is selected for the vehicle 602 to navigate.

In at least one example, the vehicle computing device(s) 604 may include one or more system controllers 626, which may be configured to control steering, propulsion, braking, safety, emitters, communication, and other systems of the vehicle 602. The system controller(s) 626 may communicate with and/or control corresponding systems of the drive system(s) 614 and/or other components of the vehicle 602.

The memory 618 may further include one or more maps 628 that may be used by the vehicle 602 to navigate within the environment. For the purpose of this discussion, a map may be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map may include, but is not limited to: texture information (e.g., color information (e.g., RGB color information, Lab color information, HSV/HSL color information), and the like), intensity information (e.g., lidar information, radar information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map may include a three-dimensional mesh of the environment. In some examples, the vehicle 602 may be controlled based at least in part on the maps 628. That is, the maps 628 may be used in connection with the localization component 620, the perception component 622, and/or the planner component 624 to determine a location of the vehicle 602, detect objects in an environment, and/or generate routes and/or trajectories to navigate within an environment. Additionally, in some examples, the maps 628 may be used in connection with a tracker component to determine a position and/or orientation of the vehicle with respect to a planned trajectory, such as based on steering angles, velocities, accelerations, drive direction, drive gear, and/or gravity acceleration.

In some examples, the one or more maps 628 may be stored on a computing device(s) (such as the computing device(s) 634) accessible via network(s) 636. In some examples, multiple maps 628 may be stored based on, for example, a characteristic (e.g., type of entity, time of day, day of week, season of the year, etc.). Storing multiple maps 628 may have similar memory requirements, but increase the speed at which data in a map may be accessed.

As illustrated in FIG. 6, the memory 618 may store log data 630. The log data 630 may represent data input and/or output by each of the localization component 620, the perception component 622, the planner component 624, the controller(s) 626, and/or outputs of various subcomponents thereof. In at least one example the log data 630 may include sensor data captured and provided to one or more of the components of the vehicle computing device(s) 604 by the sensor systems 606.

As can be understood, the components discussed herein (e.g., the localization component 620, the perception component 622, the planner component 624, the one or more system controllers 626, and the one or more maps 628 are described as divided for illustrative purposes. However, the operations performed by the various components may be combined or performed in any other component. For example, in the illustrative example, the functions of a tracker component as described above may be performed by the planner component 624. However, in other examples, the tracker component may include a separate component independent of the planner component 624.

In some instances, aspects of some or all of the components discussed herein may include any models, techniques, and/or machine learning techniques. For example, in some instances, the components in the memory 618 (and the memory 632, discussed below) may be implemented as a neural network.

In at least one example, the sensor system(s) 606 may include lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), etc. The sensor system(s) 606 may include multiple instances of each of these or other types of sensors. For instance, the lidar sensors may include individual lidar sensors located at the corners, front, back, sides, and/or top of the vehicle 602. As another example, the camera sensors may include multiple cameras disposed at various locations about the exterior and/or interior of the vehicle 602. The sensor system(s) 606 may provide input to the vehicle computing device(s) 604. Additionally, or alternatively, the sensor system(s) 606 may send sensor data, via the one or more networks 636, to the one or more computing device(s) 634 at a particular frequency, after a lapse of a predetermined period of time, in near real-time, etc.

The vehicle 602 may also include one or more emitters 608 for emitting light and/or sound, as described above. The emitters 608 in this example include interior audio and visual emitters to communicate with passengers of the vehicle 602. By way of example and not limitation, interior emitters may include speakers, lights, signs, display screens, touch screens, haptic emitters (e.g., vibration and/or force feedback), mechanical actuators (e.g., seatbelt tensioners, seat positioners, headrest positioners, etc.), and the like. The emitters 608 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 602 may also include one or more communication connection(s) 610 that enable communication between the vehicle 602 and one or more other local or remote computing device(s). For instance, the communication connection(s) 610 may facilitate communication with other local computing device(s) on the vehicle 602 and/or the drive system(s) 614. Also, the communication connection(s) 610 may allow the vehicle to communicate with other nearby computing device(s) (e.g., computing device(s) 634, other nearby vehicles, etc.) and/or one or more remote sensor system(s) for receiving sensor data.

The communications connection(s) 610 may include physical and/or logical interfaces for connecting the vehicle computing device 604 to another computing device or a network, such as network(s) 636. For example, the communications connection(s) 610 may enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.) or any suitable wired or wireless communications protocol that enables the respective computing device to interface with the other computing device(s).

In at least one example, the vehicle 602 may include one or more drive systems 614. In some examples, the vehicle 602 may have a single drive system 614. In at least one example, if the vehicle 602 has multiple drive systems 614, individual drive systems 614 may be positioned on opposite ends of the vehicle 602 (e.g., the front and the rear, etc.). In at least one example, the drive system(s) 614 may include one or more sensor systems to detect conditions of the drive system(s) 614 and/or the surroundings of the vehicle 602. By way of example and not limitation, the sensor system(s) may include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration associated with the drive systems, cameras or other image sensors, ultrasonic sensors to acoustically detect objects in the surroundings of the drive system, lidar sensors, radar sensors, etc. Some sensors, such as the wheel encoders may be unique to the drive system(s) 614. In some cases, the sensor system(s) on the drive system(s) 614 may overlap or supplement corresponding systems of the vehicle 602 (e.g., sensor system(s) 606).

The drive system(s) 614 may include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 614 may include a drive system controller which may receive and preprocess data from the sensor system(s) and to control operation of the various vehicle systems. In some examples, the drive system controller may include one or more processors and memory communicatively coupled with the one or more processors. The memory may store one or more modules to perform various functionalities of the drive system(s) 614. Furthermore, the drive system(s) 614 may also include one or more communication connection(s) that enable communication by the respective drive system with one or more other local or remote computing device(s).

In at least one example, the direct connection 612 may provide a physical interface to couple the one or more drive system(s) 614 with the body of the vehicle 602. For example, the direct connection 612 may allow the transfer of energy, fluids, air, data, etc. between the drive system(s) 614 and the vehicle 602. In some instances, the direct connection 612 may further releasably secure the drive system(s) 614 to the body of the vehicle 602.

In at least one example, the localization component 620, the perception component 622, the planner component 624, and/or the one or more system controllers 626, and/or various components thereof, may process sensor data, as described above, and may send their respective outputs as log data 630, over the one or more network(s) 636, to the computing device(s) 634. In at least one example, the vehicle computing device(s) 604 may send the log data 630 to the computing device(s) 634 at a particular frequency, after a lapse of a predetermined period of time, in near real-time, etc.

In some examples, the vehicle 602 may send sensor data to the computing device(s) 634 via the network(s) 636. In some examples, the vehicle 602 may receive sensor data from the computing device(s) 634 via the network(s) 636. The sensor data may include raw sensor data and/or processed sensor data and/or representations of sensor data. In some examples, the sensor data (raw or processed) may be sent and/or received as one or more log files.

The computing device(s) 634 may include processor(s) 638 and a memory 632 storing a feature component 640, a training component 642, and/or a machine learned (ML) model 644.

The feature component 640 may be configured to determine an IoU between a candidate bounding box and a ground truth bounding box, a yaw error associated with a candidate bounding box, an axis aligned candidate bounding box, and/or an IoU between an axis aligned candidate bounding box and a ground truth bounding box. The feature component 640 may determine an IoU between a candidate bounding box and a ground truth bounding box (e.g., determine an IoU between boxes that are aligned to different axes). The feature component 640 may determine a yaw error associated with a candidate bounding box of a detected object based on comparing a first yaw associated with the candidate bounding box to a second yaw associated with a ground truth bounding box of the detected object. The feature component 640 may identify a difference between the first yaw and the second yaw (e.g., represented by degrees of rotation). For example, the feature component 640 may determine the yaw error by comparing the first yaw to the second yaw: Additionally, or alternatively, the feature component 640 may utilize an axis associated with the ground truth bounding box (e.g., where a line of the axis may be configured using the second yaw) and determine the yaw error based on comparing the first yaw to the axis. Additionally, or alternatively, the feature component 640 may determine an axis aligned candidate bounding box based on the candidate bounding box and the ground truth bounding box. For example, the feature component 640 may be configured to rotate a candidate bounding box such that the candidate bounding box is axially aligned with the ground truth bounding box. Once the feature component 640 determines the axis aligned candidate bounding box, the feature component 640 may determine an IoU between the axis aligned candidate bounding box and the ground truth bounding box.

The training component 642 may be configured to determine a loss representing an IoU between a candidate bounding box and a ground truth bounding box, a first supplemental loss representing a yaw error associated with a candidate bounding box, a second supplemental loss representing an IoU between an axis aligned candidate bounding box and a ground truth bounding box, a loss representing the confidence value output by the ML model 644 in association with the candidate bounding box, and/or one or more weights to apply to any of the losses prior to training the ML model 644. In some examples, the training component 642 may determine the loss representing the IoU and/or the second supplemental loss representing the IoU between the axis aligned candidate bounding box and a ground truth bounding box using one or more regression loss techniques, such as, for example, an L1 regression loss and/or an L2 regression loss. Additionally, or alternatively, the training component 642 may determine the loss associated with the confidence value and/or the first supplemental loss representing the yaw error using one or more classification losses, such as, for example, a binary cross entropy loss and/or a SoftMax loss.

The training component 642 may determine the first loss representing the yaw error associated with the candidate bounding box. For example, the training component may determine, based on a yaw error, if the yaw associated with a candidate bounding box is a good yaw or not. The training component 642 may determine that a yaw error associated with a candidate bounding box is a good yaw if the yaw error is less than a threshold error (e.g., within 1 degree, 2 degrees, etc.). The training component 642 may then configure the first loss as a classification loss, such as, for example, a binary cross entropy loss and/or a SoftMax loss, indicating whether the yaw associated with the candidate bounding box is a good yaw or not. Additionally, or alternatively, the training component 642 may determine a second loss representing the IoU between an axis aligned candidate bounding box and a ground truth bounding box. For example, the training component 642 may determine the second loss based on the IoU between the candidate bounding box and the ground truth bounding box using one or more regression algorithms, such as, for example, a direct regression to the axis aligned IoU number associated with the candidate bounding box. Additionally, or alternatively, the training component 642 may determine the confidence value loss associated with the candidate bounding box. For example, the training component 642 may determine, based on the confidence value, whether or not a detection of an object exists in association with the candidate bounding box. The training component 642 may then configure the loss associated with the confidence value as a classification loss, such as, for example, a binary cross entropy loss and/or a SoftMax loss, indicating that either a detection of the object exists or a detection of the object does not exist with respect to the candidate bounding box.

The training component 642 may be configured to determine training data for training the ML model 644 based on the one or more losses and/or additional data output by the ML model 644 and/or processed by the feature component 640.

Additionally, or alternatively, prior to training the ML model 644, the training component 642 may apply one or more weights to the losses based on various observations associated with the confidence value output by the machine learned model, the yaw error determined for a candidate bounding box, and/or the IoU determined for a candidate bounding box. While example scenarios of applying weights to one or more losses are described below, such scenarios are exemplary and not intended to be limiting as any weights to any losses may be tuned to any values depending on use case and/or desired outcomes. In some examples, the training component 642 may determine a weight to apply to a loss based on a classification of the object, one or more dimensions associated with a candidate bounding box, one or more parameters associated with a candidate bounding box satisfying a threshold value (e.g., being less than, greater than, or sufficiently close to a threshold value). Different weights may be applied to different losses, where losses with greater weights than losses with lesser weights have a greater significance when training the ML model 644.

For example, the training component 642 may determine a classification of the object associated with a candidate bounding box. The training component 642 may determine that the classification corresponds to a pedestrian and the training component may apply a first weight to the confidence value and a second weight to the yaw loss and/or the IoU loss, where the first weight is greater than the second weight. Additionally, or alternatively, the training component 642 may determine that the classification corresponds to a vehicle and the training component may apply a first weight to the yaw loss and/or the IoU and a second weight to the confidence value, where the first weight is greater than the second weight. While examples of a classification corresponding to a pedestrian and a vehicle are included, the classification may correspond to any one of a vehicle, a pedestrian, a bicycle, a vehicle having non-standard vehicular dimensions (e.g., a semi-truck, a tractor, a tow truck, and/or the like), and/or a stationary object (e.g., a roadblock, a garbage can, and/or the like), and any number of weights may be applied to the losses (e.g., the loss associated with the confidence value, the IoU loss, the yaw loss, and/or the axis aligned IoU loss) prior to training.

Additionally, or alternatively, the weights may be further applied and/or modified based on additional parameters associated with a candidate bounding box, such as, for example, dimensions (e.g., length, width, and/or height) associated with the object, a velocity associated with the object, a motion state associated with the object, and/or the like.

Additionally, or alternatively, the training component 642 may identify one or more dimensions associated with a candidate bounding box. For example, the training component 642 may identify a length and/or a width associated with the candidate bounding box, and the training component 642 may determine a difference between the length and the width. In some examples, the training component 642 may determine that a difference between the length and the width satisfies a threshold difference, and thus the system should consider the yaw loss and the IoU loss with higher confidence than the confidence value during training. As such, the training component 642 may apply a first weight to the yaw loss and/or the IoU and a second weight to the confidence value, where the first weight is greater than the second weight. Additionally, or alternatively, the training component 642 may determine that a difference between the length and width does not satisfy the threshold difference, or is otherwise sufficiently close in dimension, and thus the system should consider the yaw loss, the IoU loss, and the confidence value with the same confidence during training. As such, the training component 642 may forgo weighting the losses and/or weight the losses based on additional observations.

Additionally, or alternatively, the feature component 640 may be configured to identify a good yaw score associated with a candidate bounding box. For example, the feature component 640 may determine that a yaw parameter associated with a candidate bounding box is within a threshold similarity to a yaw parameter associated with a corresponding ground truth bounding box (e.g., within 1 degree of each other), and the feature component 640 may provide an indication to the system that this is a good yaw score and thus the system should consider the yaw loss with a higher confidence than the IoU loss and the confidence value at the time of training. In such examples, the training component 642 may apply a first weight to the yaw loss and a second weight to the IoU and/or the confidence value, where the first weight is greater than the second weight.

The ML model 644 may be configured to output one or more tensors representing the environment and/or one or more candidate bounding boxes representing an object detection in the environment. In some examples, the one or more candidate bounding boxes may be included in the one or more tensors. Additionally, or alternatively, the one or more tensors may store feature data associated with the candidate bounding box representing the object detection. Additionally, or alternatively, the ML model 644 may be configured to consume one or more losses and/or training data, determined by the training component 642, such that the ML model may be trained based on the one or more losses and/or the training data.

In various examples, the computing device(s) 634 may include one or more input/output (I/O) devices, such as via one or more interfaces 646. The interface(s) 646 may include I/O interfaces and/or network interfaces. The I/O interface(s) may include speakers, a microphone, a camera, and various user controls (e.g., buttons, a joystick, a keyboard, a keypad, etc.), a haptic output device, and so forth. The network interface(s) may include one or more interfaces and hardware components for enabling communication with various other devices over the network or directly. For example, network interface(s) may enable communication through one or more of the Internet, cable networks, cellular networks, wireless networks (e.g., Wi-Fi) and wired networks, as well as close-range communications such as Bluetooth®, Bluetooth® low energy, and the like, as additionally enumerated elsewhere herein.

In such examples, the interface(s) 646 may include one or more displays. Depending on the type of computing device, such as a user computing device, server computing device, or the like, the display may employ any suitable display technology. For example, the display may be a liquid crystal display, a plasma display, a light emitting diode display, an OLED (organic light-emitting diode) display, an electronic paper display, or any other suitable type of display able to present digital content thereon. In some examples, the display may have a touch sensor associated with the display to provide a touchscreen display configured to receive touch inputs for enabling interaction with a graphical user interface presented on the display. Accordingly, examples herein are not limited to any particular display technology.

The processor(s) 616 of the vehicle 602 and the processor(s) 638 of the computing device(s) 634 may be any suitable processor capable of executing instructions to process data and perform operations as described herein. By way of example and not limitation, the processor(s) 616 and 638 may comprise one or more Central Processing Units (CPUs), Graphics Processing Units (GPUs), or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions.

The memory 618 and 632 are examples of non-transitory computer-readable media. The memory 618 and 632 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, aspects of some or all of the components discussed herein can include any models, algorithms, and/or machine learning algorithms. For example, in some instances, the components in the memory 618 and 632 can be implemented as a neural network.

As described herein, an exemplary neural network is an algorithm that passes input data through a series of connected layers to produce an output. Each layer in a neural network may also comprise another neural network, or may comprise any number of layers (whether convolutional or not). As may be understood in the context of this disclosure, a neural network may utilize machine learning, which may refer to a broad class of such algorithms in which an output is generated based on learned parameters.

Although discussed in the context of neural networks, any type of machine learning may be used consistent with this disclosure. For example, machine learning or machine-learned algorithms may include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks such as ResNet50, ResNet52, ResNet101, VGG, DenseNet, PointNet, and the like.

Example Clauses

A: A system comprising: one or more processors; and one or more non-transitory computer-readable media storing instructions executable by one or more processors, wherein the instructions, when executed, cause the system to perform operations comprising: receiving sensor data representing an object in an environment; determining, based at least in part on the sensor data, multi-channel input data representing the environment: inputting the multi-channel input data into a machine-learned (ML) model: determining, by the ML model, a candidate bounding box representing the object in the environment and a confidence value associated with the candidate bounding box: receiving ground truth data associated with the multi-channel input data, the ground truth data including a ground truth bounding box associated with the object: determining an intersection over union (IoU) between the candidate bounding box the ground truth bounding box: determining a first loss based at least in part on the IoU: determining a second loss based at least in part on the confidence value associated with the candidate bounding box; and training the ML model based at least in part on the first loss and the second loss.

B: The system of paragraph A, the operations further comprising: sending the ML model to an autonomous vehicle; and controlling the autonomous vehicle based at least in part on the ML model.

C: The system of paragraph A or B, the operations further comprising: determining a yaw score associated with the candidate bounding box based at least in part on a first yaw of the candidate bounding box and a second yaw of the ground truth bounding box: determining a third loss based at least in part on the yaw score, wherein the third loss is one of a binary cross entropy loss or a SoftMax loss; and training the ML model based at least in part on the third loss.

D: The system of any of paragraphs A-C, wherein the IoU is a first IoU, and the operations further comprising: determining an axis aligned bounding box based at least in part on one of rotating the candidate bounding box to an axis associated with the ground truth bounding box or rotating the ground truth bounding box to an axis associated with the candidate bounding box: determining a second IoU between the axis aligned bounding box and one of the candidate bounding box or the ground truth bounding box: determining a third loss based at least in part on the second IoU, wherein the third loss is a regression loss; and training the ML model based at least in part on the third loss.

E: The system of paragraph D, the operations further comprising: determining, based at least in part on the candidate bounding box, a length associated with the object and a width associated with the object: determining that a difference between the length and width exceed a threshold amount; and prior to training the ML model and based at least in part on determining that the length and width differ by at least the threshold amount, assigning a first weight to at least one of the first loss and a second weight to the second loss, wherein the first weight is greater than the second weight.

F: The system of paragraph D or E, the operations further comprising: determining, based at least in part on the candidate bounding box, a length associated with the object and a width associated with the object: determining that a difference between the length and width is within a threshold amount; and prior to training the ML model and based at least in part on determining that the length and width are within the threshold amount, assigning a first weight to the second loss and a second weight to the first loss, wherein the first weight is greater than the second weight.

G: One or more non-transitory computer-readable media storing instructions executable by a processor, wherein the instructions, when executed, cause the processor to perform operations comprising: receiving sensor data representing an object in an environment: inputting the sensor data into a machine-learned (ML) model; determining, by the ML model, a candidate bounding box representing the object; determining a geometric alignment between a ground truth bounding box associated with the object and the candidate bounding box: determining a first loss based at least in part on the geometric alignment; and determining a second loss associated with the candidate bounding box and the ground truth bounding box based on a confidence value output by the ML model; and training the ML model based at least in part on the first loss and the second loss.

H: The one or more non-transitory computer-readable media of paragraph G, the operations further comprising: sending the ML model to an autonomous vehicle; and controlling the autonomous vehicle based at least in part on the ML model.

I: The one or more non-transitory computer-readable media of paragraph G or H, wherein the candidate bounding box indicates one or more of: a center offset value associated with the object: a classification associated with the object: one or more dimensions associated with the object: an orientation associated with the object: a velocity associated with the object: a motion state associated with the object; or a direction associated with the object.

J: The one or more non-transitory computer-readable media of any of paragraphs G-I, wherein the sensor data includes one or more pixels representing the object, and the operations further comprising: determining, based at least in part on the candidate bounding box, one or more classifications associated with individual ones of the pixels representing the object, the classifications including one of: a car: a truck: a bicycle: a stationary object; or a pedestrian; and prior to training the ML model and based at least in part on determining the classifications, assigning a first weight to one of the first loss or the second loss and a second weight to one of the first loss or the second loss, wherein the first weight is greater than the second weight.

K: The one or more non-transitory computer-readable media of any of paragraphs G-J, the operations further comprising: determining, based at least in part on the candidate bounding box, a length associated with the object and a width associated with the object: determining that a difference between the length and width exceed a threshold amount: prior to training the ML model and based at least in part on determining that the length and width differ by at least the threshold amount, assigning a first weight the first loss and a second weight to the second loss, wherein the first weight is greater than the second weight; and training the ML model further based at least in part on the first weight and the second weight.

L: The one or more non-transitory computer-readable media of any of paragraphs G-K, the operations further comprising: determining, based at least in part on the candidate bounding box, a length associated with the object and a width associated with the object: determining that a difference between the length and width is within a threshold amount: prior to training the ML model and based at least in part on determining that the length and width are within the threshold amount, assigning a first weight to the second loss and a second weight to the first loss, wherein the first weight is greater than the second weight; and training the ML model further based at least in part on the first weight and the second weight.

M: The one or more non-transitory computer-readable media of any of paragraphs G-L, the operations further comprising: determining a yaw score associated with the candidate bounding box based at least in part on a first yaw of the candidate bounding box and a second yaw of the ground truth bounding box: determining a third loss based at least in part on the yaw score: determining that the yaw score satisfies a threshold yaw score: prior to training the ML model and based at least in part on determining that the yaw score is less than the threshold yaw score, assigning a first weight to the third loss and a second weight to at least one of the first loss or the second loss, wherein the first weight is greater than the second weight; and training the ML model further based at least in part on the first weight and the second weight.

N: A method comprising: receiving sensor data representing an object in an environment: inputting the sensor data into a machine-learned (ML) model; determining, by the ML model, a candidate bounding box representing the object; determining a geometric alignment between a ground truth bounding box associated with the object and the candidate bounding box: determining a first loss based at least in part on the geometric alignment: determining a second loss associated with the candidate bounding box and the ground truth bounding box based on a confidence value output by the ML model; and training the ML model based at least in part on the first loss and the second loss.

O: The method of paragraph N, further comprising: sending the ML model to an autonomous vehicle; and controlling the autonomous vehicle based at least in part on the ML model.

P: The method of paragraph N or O, wherein the candidate bounding box indicates one or more of: a center offset value associated with the object: a classification associated with the object: one or more dimensions associated with the object: an orientation associated with the object: a velocity associated with the object: a motion state associated with the object; or a direction associated with the object.

Q: The method of any of paragraphs N-P, wherein the sensor data includes one or more pixels representing the object, and the method further comprising: determining, based at least in part on the candidate bounding box, one or more classifications associated with individual ones of the pixels representing the object, the classifications including one of: a car: a truck: a bicycle: a stationary object; or a pedestrian; and prior to training the ML model and based at least in part on determining the classifications, assigning a first weight to one of the first loss or the second loss and a second weight to one of the first loss or the second loss, wherein the first weight is greater than the second weight.

R: The method of any of paragraphs N-Q, further comprising: determining, based at least in part on the candidate bounding box, a length associated with the object and a width associated with the object: determining that a difference between the length and width exceed a threshold amount: prior to training the ML model and based at least in part on determining that the length and width differ by at least the threshold amount, assigning a first weight to the first loss and a second weight to the second loss, wherein the first weight is greater than the second weight; and training the ML model further based at least in part on the first weight and the second weight.

S: The method of any of paragraphs N-R, further comprising: determining, based at least in part on the candidate bounding box, a length associated with the object and a width associated with the object: determining that a difference between the length and width is within a threshold amount: prior to training the ML model and based at least in part on determining that the length and width are within the threshold amount, assigning a first weight to the second loss and a second weight to the first loss, wherein the first weight is greater than the second weight; and training the ML model further based at least in part on the first weight and the second weight.

T: The method of any of paragraphs N-S, further comprising: determining a yaw score associated with the candidate bounding box based at least in part on a first yaw of the candidate bounding box and a second yaw of the ground truth bounding box; determining a third loss based at least in part on the yaw score: determining that the yaw score satisfies a threshold yaw score: prior to training the ML model and based at least in part on determining that the yaw score is less than the threshold yaw score, assigning a first weight to the third loss and a second weight to the first loss or the second loss, wherein the first weight is greater than the second weight; and training the ML model further based at least in part on the first weight and the second weight.

While the example clauses described above are described with respect to one particular implementation, it should be understood that, in the context of this document, the content of the example clauses may also be implemented via a method, device, system, computer-readable medium, and/or another implementation. Additionally, any of examples A-T may be implemented alone or in combination with any other one or more of the examples A-T.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples may be used and that changes or alterations, such as structural changes, may be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:
   one or more processors; and
   one or more non-transitory computer-readable media storing instructions executable by one or more processors, wherein the instructions, when executed, cause the system to perform operations comprising:
      receiving sensor data representing an object in an environment;
      determining, based at least in part on the sensor data, multi-channel input data representing the environment;
      inputting the multi-channel input data into a machine-learned (ML) model;
      determining, by the ML model, a candidate bounding box representing the object in the environment and a confidence value associated with the candidate bounding box;
      receiving ground truth data associated with the multi-channel input data, the ground truth data including a ground truth bounding box associated with the object;
      determining an intersection over union (IoU) between the candidate bounding box the ground truth bounding box;
      determining a first loss based at least in part on the IoU:
      determining a second loss based at least in part on the confidence value associated with the candidate bounding box; and
      training the ML model based at least in part on the first loss and the second loss.

2. The system of claim 1, the operations further comprising:
   sending the ML model to an autonomous vehicle; and
   controlling the autonomous vehicle based at least in part on the ML model.

3. The system of claim 1, the operations further comprising:
   determining a yaw score associated with the candidate bounding box based at least in part on a first yaw of the candidate bounding box and a second yaw of the ground truth bounding box;
   determining a third loss based at least in part on the yaw score, wherein the third loss is one of a binary cross entropy loss or a SoftMax loss; and
   training the ML model based at least in part on the third loss.

4. The system of claim 1, wherein the IoU is a first IoU, and the operations further comprising:
   determining an axis aligned bounding box based at least in part on one of rotating the candidate bounding box to an axis associated with the ground truth bounding box or rotating the ground truth bounding box to an axis associated with the candidate bounding box;
   determining a second IoU between the axis aligned bounding box and one of the candidate bounding box or the ground truth bounding box;
   determining a third loss based at least in part on the second IoU, wherein the third loss is a regression loss; and
   training the ML model based at least in part on the third loss.

5. The system of claim 4, the operations further comprising:
   determining, based at least in part on the candidate bounding box, a length associated with the object and a width associated with the object;
   determining that a difference between the length and width exceed a threshold amount; and
   prior to training the ML model and based at least in part on determining that the length and width differ by at least the threshold amount, assigning a first weight to at least one of the first loss and a second weight to the second loss, wherein the first weight is greater than the second weight.

6. The system of claim 4, the operations further comprising:
   determining, based at least in part on the candidate bounding box, a length associated with the object and a width associated with the object;

determining that a difference between the length and width is within a threshold amount; and prior to training the ML model and based at least in part on determining that the length and width are within the threshold amount, assigning a first weight to the second loss and a second weight to the first loss, wherein the first weight is greater than the second weight.

7. One or more non-transitory computer-readable media storing instructions executable by a processor, wherein the instructions, when executed, cause the processor to perform operations comprising:

receiving sensor data representing an object in an environment;

inputting the sensor data into a machine-learned (ML) model;

determining, by the ML model, a candidate bounding box representing the object;

determining a geometric alignment between a ground truth bounding box associated with the object and the candidate bounding box;

determining a first loss based at least in part on the geometric alignment; and determining a second loss associated with the candidate bounding box and the ground truth bounding box based on a confidence value output by the ML model; and training the ML model based at least in part on the first loss and the second loss.

8. The one or more non-transitory computer-readable media of claim 7, the operations further comprising:

sending the ML model to an autonomous vehicle; and
controlling the autonomous vehicle based at least in part on the ML model.

9. The one or more non-transitory computer-readable media of claim 7, wherein the candidate bounding box indicates one or more of:

a center offset value associated with the object;
a classification associated with the object;
one or more dimensions associated with the object;
an orientation associated with the object;
a velocity associated with the object;
a motion state associated with the object; or
a direction associated with the object.

10. The one or more non-transitory computer-readable media of claim 7, wherein the sensor data includes one or more pixels representing the object, and the operations further comprising:

determining, based at least in part on the candidate bounding box, one or more classifications associated with individual ones of the pixels representing the object, the classifications including one of:
a car;
a truck;
a bicycle;
a stationary object; or
a pedestrian; and
prior to training the ML model and based at least in part on determining the classifications, assigning a first weight to one of the first loss or the second loss and a second weight to one of the first loss or the second loss, wherein the first weight is greater than the second weight.

11. The one or more non-transitory computer-readable media of claim 7, the operations further comprising:

determining, based at least in part on the candidate bounding box, a length associated with the object and a width associated with the object;

determining that a difference between the length and width exceed a threshold amount;

prior to training the ML model and based at least in part on determining that the length and width differ by at least the threshold amount, assigning a first weight to the first loss and a second weight to the second loss, wherein the first weight is greater than the second weight; and training the ML model further based at least in part on the first weight and the second weight.

12. The one or more non-transitory computer-readable media of claim 7, the operations further comprising:

determining, based at least in part on the candidate bounding box, a length associated with the object and a width associated with the object;

determining that a difference between the length and width is within a threshold amount;

prior to training the ML model and based at least in part on determining that the length and width are within the threshold amount, assigning a first weight to the second loss and a second weight to the first loss, wherein the first weight is greater than the second weight; and training the ML model further based at least in part on the first weight and the second weight.

13. The one or more non-transitory computer-readable media of claim 7, the operations further comprising:

determining a yaw score associated with the candidate bounding box based at least in part on a first yaw of the candidate bounding box and a second yaw of the ground truth bounding box;

determining a third loss based at least in part on the yaw score;

determining that the yaw score satisfies a threshold yaw score;

prior to training the ML model and based at least in part on determining that the yaw score is less than the threshold yaw score, assigning a first weight to the third loss and a second weight to at least one of the first loss or the second loss, wherein the first weight is greater than the second weight; and training the ML model further based at least in part on the first weight and the second weight.

14. A method comprising:

receiving sensor data representing an object in an environment;

inputting the sensor data into a machine-learned (ML) model;

determining, by the ML model, a candidate bounding box representing the object;

determining a geometric alignment between a ground truth bounding box associated with the object and the candidate bounding box;

determining a first loss based at least in part on the geometric alignment;

determining a second loss associated with the candidate bounding box and the ground truth bounding box based on a confidence value output by the ML model; and training the ML model based at least in part on the first loss and the second loss.

15. The method of claim 14, further comprising:

sending the ML model to an autonomous vehicle; and
controlling the autonomous vehicle based at least in part on the ML model.

16. The method of claim 14, wherein the candidate bounding box indicates one or more of:

a center offset value associated with the object;
a classification associated with the object;

one or more dimensions associated with the object;
an orientation associated with the object;
a velocity associated with the object;
a motion state associated with the object; or
a direction associated with the object.

17. The method of claim 14, wherein the sensor data includes one or more pixels representing the object, and the method further comprising:
  determining, based at least in part on the candidate bounding box, one or more classifications associated with individual ones of the pixels representing the object, the classifications including one of:
    a car;
    a truck;
    a bicycle;
    a stationary object; or
    a pedestrian; and
  prior to training the ML model and based at least in part on determining the classifications, assigning a first weight to one of the first loss or the second loss and a second weight to one of the first loss or the second loss, wherein the first weight is greater than the second weight.

18. The method of claim 14, further comprising:
  determining, based at least in part on the candidate bounding box, a length associated with the object and a width associated with the object;
  determining that a difference between the length and width exceed a threshold
  prior to training the ML model and based at least in part on determining that the length and width differ by at least the threshold amount, assigning a first weight to the first loss and a second weight to the second loss, wherein the first weight is greater than the second weight; and
  training the ML model further based at least in part on the first weight and the second weight.

19. The method of claim 14, further comprising:
  determining, based at least in part on the candidate bounding box, a length associated with the object and a width associated with the object;
  determining that a difference between the length and width is within a threshold amount:
  prior to training the ML model and based at least in part on determining that the length and width are within the threshold amount, assigning a first weight to the second loss and a second weight to the first loss, wherein the first weight is greater than the second weight; and
  training the ML model further based at least in part on the first weight and the second weight.

20. The method of claim 14, further comprising:
  determining a yaw score associated with the candidate bounding box based at least in part on a first yaw of the candidate bounding box and a second yaw of the ground truth bounding box;
  determining a third loss based at least in part on the yaw score:
  determining that the yaw score satisfies a threshold yaw score;
  prior to training the ML model and based at least in part on determining that the yaw score is less than the threshold yaw score, assigning a first weight to the third loss and a second weight to the first loss or the second loss, wherein the first weight is greater than the second weight; and
  training the ML model further based at least in part on the first weight and the second weight.

* * * * *